(12) United States Patent
Gray

(10) Patent No.: US 8,844,104 B2
(45) Date of Patent: Sep. 30, 2014

(54) MULTI-ZONE MACHINE TOOL SYSTEM

(75) Inventor: Paul J. Gray, Zionsville, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 1084 days.

(21) Appl. No.: 12/765,543

(22) Filed: Apr. 22, 2010

(65) Prior Publication Data

US 2010/0269327 A1    Oct. 28, 2010

Related U.S. Application Data

(60) Provisional application No. 61/171,794, filed on Apr. 22, 2009, provisional application No. 61/172,066, filed on Apr. 23, 2009.

(51) Int. Cl.
| B23P 23/00 | (2006.01) |
| B23Q 39/02 | (2006.01) |
| B23Q 39/04 | (2006.01) |

(52) U.S. Cl.
CPC .............. *B23Q 39/027* (2013.01); *B23Q 39/04* (2013.01)
USPC ............... 29/27 C; 29/27 R; 29/767; 700/172

(58) Field of Classification Search
USPC ........ 29/557, 27 R, 27 C, 767; 700/172, 179; 409/134, 166
See application file for complete search history.

(56) References Cited

U.S. PATENT DOCUMENTS

| 4,131,836 A | 12/1978 | Noda |
| 4,138,718 A | 2/1979 | Toke et al. |
| 4,281,379 A | 7/1981 | Austin |
| 4,489,377 A | 12/1984 | Mawyer et al. |
| 4,651,471 A * | 3/1987 | Makino et al. .................. 451/57 |
| 4,794,514 A | 12/1988 | Hideaki et al. |
| 5,248,924 A | 9/1993 | Niwa |
| 5,368,539 A * | 11/1994 | Mills et al. ........................ 483/1 |
| 5,400,259 A | 3/1995 | Murphy et al. |
| 5,417,130 A | 5/1995 | Dorsch |
| 5,453,933 A | 9/1995 | Wright et al. |

(Continued)

FOREIGN PATENT DOCUMENTS

| EP | 0 328 666 A1 | 8/1989 |
| EP | 0 519 077 A1 | 12/1992 |

(Continued)

OTHER PUBLICATIONS

Krovi, Venkat, Kumar, Vijay, Ananthasuresh, G.K., and Vezien, Jean-Marc, "Design and Virtual Prototyping of Rehabilitation Aids," ASME Journal of Mechanical Design, vol. 121, No. 3, pp. 456-458, Sep. 1999.

(Continued)

*Primary Examiner* — Minh Trinh
(74) *Attorney, Agent, or Firm* — Faegre Baker Daniels LLP

(57) ABSTRACT

The present disclosure includes a machine tool system having multiple zones. The zones may be areas divided by physical barriers or virtual zones. The zones may include a first zone having a first kinematics arrangement and a second zone having a second kinematics arrangement. The first zone and the second zone may share one or more machine axis and at least one of the first zone and the second zone has at least one non-shared machine axis. The present disclosure also includes multi-interface machine tool systems.

10 Claims, 18 Drawing Sheets

(56) References Cited

U.S. PATENT DOCUMENTS

| | | | |
|---|---|---|---|
| 5,611,032 A | 3/1997 | Matsuura et al. | |
| 5,691,909 A | 11/1997 | Frey et al. | |
| 5,735,513 A | 4/1998 | Toffolon | |
| 6,019,554 A | 2/2000 | Hong | |
| 6,022,132 A * | 2/2000 | Schulz | 700/186 |
| 6,356,800 B1 | 3/2002 | Monz et al. | |
| 6,445,959 B1 | 9/2002 | Poth | |
| 6,445,964 B1 | 9/2002 | White et al. | |
| 6,502,002 B2 * | 12/2002 | Susnjara et al. | 700/95 |
| 6,745,098 B2 | 6/2004 | Belanger | |
| 6,949,055 B2 * | 9/2005 | Ferrari et al. | 483/6 |
| 6,999,841 B1 | 2/2006 | Rutkowski | |
| 7,117,056 B2 | 10/2006 | Balic | |
| 7,127,322 B2 | 10/2006 | Kreidler et al. | |
| 7,440,874 B2 | 10/2008 | Durney et al. | |
| 7,581,459 B2 * | 9/2009 | Gourjon | 74/55 |
| 7,590,458 B2 | 9/2009 | Endo et al. | |
| 7,684,891 B2 | 3/2010 | Okrongli et al. | |
| 2002/0092149 A1 * | 7/2002 | Wolf et al. | 29/464 |
| 2002/0175445 A1 * | 11/2002 | Gruau et al. | 264/248 |
| 2003/0195642 A1 | 10/2003 | Ragnini | |
| 2004/0128016 A1 | 7/2004 | Stewart | |
| 2007/0061037 A1 | 3/2007 | Grossmann et al. | |
| 2007/0191982 A1 | 8/2007 | Sullivan | |
| 2008/0033591 A1 | 2/2008 | Lankalapalli et al. | |
| 2008/0058982 A1 * | 3/2008 | Gray | 700/159 |
| 2008/0058984 A1 * | 3/2008 | Gray et al. | 700/192 |
| 2008/0091394 A1 | 4/2008 | Hahn et al. | |
| 2009/0271026 A1 | 10/2009 | Lerisson et al. | |
| 2009/0312858 A1 | 12/2009 | Alpay et al. | |
| 2010/0023156 A1 | 1/2010 | Trepina et al. | |
| 2010/0031487 A1 * | 2/2010 | Messina et al. | 29/26 A |

FOREIGN PATENT DOCUMENTS

| | | |
|---|---|---|
| EP | 1 528 454 A2 | 5/2005 |
| JP | 3037703 A | 2/1991 |
| JP | 2003316405 | 11/2003 |
| WO | WO 2004/025400 A2 | 3/2004 |
| WO | WO 2009/037066 A1 | 3/2009 |
| WO | WO 2010/003882 A2 | 1/2010 |

OTHER PUBLICATIONS

Luo, Y.B., Ong, S.K., Chen, D.F., and Nee, A.Y.C., "An Internet-enabled image- and model-based virtual machining system," Int. J. Prod. Res., vol. 40, No. 10, pp. 2269-2288, 2002.

Xu, X.W., Wang, H., Mao, J., Newman, S.T., Kramer, T.R., Proctor, F.M., and Michaloski, J.L., "STEP-compliant NC research: the search for intelligent CAD/CAPP/CAM/CNC integration," Int. J. Prod. Res., vol. 43, No. 17, pp. 3703-3743, Sep. 1, 2005.

Yusof, Yusri, Newman, Stephen, Nassehi, Aydin, and Case, Keith, "Interoperable CNC System for Turning Operations," World Academy of Science, Engineering and Technology, vol. 49, pp. 928-934, 2009.

Roth, D., Ismail, F., and Bedi, S., "Mechanistic modelling of 5-axis milling using an adaptive depth buffer," pp. 1-40, 2003.

* cited by examiner

MULTI-ZONE MACHINE TOOL SYSTEM

CROSS REFERENCE TO RELATED APPLICATIONS

This application claims the benefit of U.S. Patent Application Ser. No. 61/171,794, filed Apr. 22, 2009, titled MULTI-ZONE MACHINE TOOL SYSTEM, and U.S. Patent Application Ser. No. 61/172,066, filed Apr. 23, 2009, titled MULTI-ZONE MACHINE TOOL SYSTEM, the disclosures of which are expressly incorporated by reference herein.

This application is related to U.S. patent application Ser. No. 11/833,971, filed Aug. 3, 2007, titled GENERALIZED KINEMATICS SYSTEM, U.S. Patent Application Ser. No. 61/171,827, filed Apr. 22, 2009, titled UNIVERSAL CONVERSATIONAL PROGRAMMING FOR MACHINE TOOL SYSTEMS, U.S. Patent Application Ser. No. 61/171,839, filed Apr. 22, 2009, titled VIRTUAL MACHINE MANAGER, U.S. Patent Application Ser. No. 61/171,963, filed Apr. 23, 2009, titled UNIVERSAL CONVERSATIONAL PROGRAMMING FOR MACHINE TOOL SYSTEMS, U.S. Patent Application Ser. No. 61/172,044, filed Apr. 23, 2009, titled VIRTUAL MACHINE MANAGER, U.S. patent application Ser. No 12/765,586, filed Apr. 22, 2010, titled VIRTUAL MACHINE MANAGER, U.S. patent application Ser. No. 12/765,352, filed Apr. 22, 2010, titled UNIVERSAL CONVERSATIONAL PROGRAMMING FOR MACHINE TOOL SYSTEMS, the disclosures of which are expressly incorporated by reference herein.

BACKGROUND

The present invention relates to machine tool systems and the operation thereof, and in particular to multi-zone machine tool systems and the operation thereof wherein at least two of the zones have differing kinematic arrangements.

Machine tool systems are known which include multiple work zones. Often these multiple work zones are divided by a physical partition so that an operator may setup a first part while a second part is being cut with the machine tool system.

SUMMARY

In one embodiment, a machine tool system is provided having multiple zones wherein at least a first zone and a second zone have differing kinematic arrangements. In one example, the first zone and the second zone are respective areas of a machine tool workspace divided by one or more physical barriers. In another example, the first zone and the second zone are virtual zones. In one variation, the first zone and the second zone are at least partially overlapping.

In another embodiment, a machine tool system is provided having a plurality of selectable zones including at least a first zone and a second zone have differing kinematic arrangements. In one example, the first zone and the second zone may share one or more machine axis. In another example, at least one of the first zone and the second zone has at least one non-shared machine axis.

In another exemplary embodiment of the present disclosure, a method of machining a plurality of parts with a machine tool system is provided. The method comprising the steps of: positioning a first part in a first region of a machine tool workspace of the machine tool system; positioning a second part in a second region of the machine tool workspace of the machine tool system; machining the first part in the first region of the machine tool workspace with at least one tool supported by a tool spindle of the machine tool system; and machining the second part in the second region of the machine tool workspace with at least one tool supported by the tool spindle of the machine tool system. The machine tool system has a first kinematics arrangement in the first region while machining the first part and a second kinematics arrangement in the second region while machining the second part. The second kinematics arrangement being different from the first kinematics arrangement.

In yet another exemplary embodiment of the present disclosure, an apparatus for machining a plurality of parts with at least one tool is provided. The apparatus comprising a frame and a support supported by the frame. The support supporting a first part in a first zone of a plurality of selectable zones associated with the support and a second part in a second zone of the plurality of selectable zones associated with the support. Each of the plurality of selectable zones being located within a machining workspace of the apparatus. The apparatus further comprising a machine tool spindle supported by the frame and moveable relative to the first part and the second part. The machine tool spindle adapted to couple the at least one tool. At least one of the support and the machine tool spindle including a plurality of moveable axes which position the at least one tool relative to the first part and the second part. The apparatus further comprising a motion control system operably coupled to at least one of the machine tool spindle and the support. The motion control system executing the machining of the first part and the second part through a controlled movement of the plurality of moveable axes. The first zone has a first kinematics arrangement controlled by the motion control system to machine the first part and the second zone has a second kinematics arrangement controlled by the motion control system to machine the second part. The first kinematics arrangement differing from the second kinematics arrangement.

In still another exemplary embodiment of the present disclosure, an apparatus for machining a part with at least one tool is provided. The apparatus comprising a frame and a support supported by the frame. The support supporting the part in one of a plurality of selectable zones associated with the support. Each of the plurality of selectable zones being located within a machining workspace of the apparatus and defining an offset relative to a machine coordinate system. The apparatus further comprising a machine tool spindle supported by the frame and moveable relative to the part. The machine tool spindle adapted to couple the at least one tool. At least one of the support and the machine tool spindle including a plurality of moveable axes which position the at least one tool relative to the part. The apparatus further comprising a motion control system operably coupled to at least one of the machine tool spindle and the support. The motion control system executing the machining of the part through a controlled movement of the plurality of moveable axes. The controlled movement of the plurality moveable axes is based on a part program which includes instructions related to the machining of the part and a selection of a first zone of the selectable zones associated with the support.

In a further exemplary embodiment of the present disclosure, a method of machining a part with a multi-interface machine tool system is provided. The method comprising the steps of: providing a first zone having a first interface which supports a first tool, the first tool being configured to remove material from the part; providing a second zone having a second interface which supports a second tool, the second tool being configured to remove material from the part; and machining the part with the first tool and the second tool simultaneously. The movement of the first tool and the second tool being controlled by a motion control system executing a common part program having instructions relative to the first interface and the second interface.

In still a further exemplary embodiment of the present disclosure, a multi-interface machine tool system for machining a part is provided. The multi-interface machine tool system comprising a device for supporting the part; a first zone having a first interface which supports a first tool and includes a first plurality of moveable axes to position the first tool, the first tool being configured to remove material from the part; a second zone having a second interface which supports a second tool and includes a second plurality of moveable axes to position the second tool, the second tool being configured to remove material from the part; and a motion control system operably coupled to the first interface and the second interface. The motion control system executing the machining of the part through a controlled movement of the first plurality of moveable axes and a controlled movement of the second plurality of moveable axes. The controlled movement of the first plurality moveable axes is based on a part program which includes instructions related to the machining of the part and a selection of the first zone. The controlled movement of the second plurality moveable axes is based on the part program which includes instructions related to the machining of the part and a selection of the second zone.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiment is chosen and described so that others skilled in the art may utilize its teachings.

Figure 1:
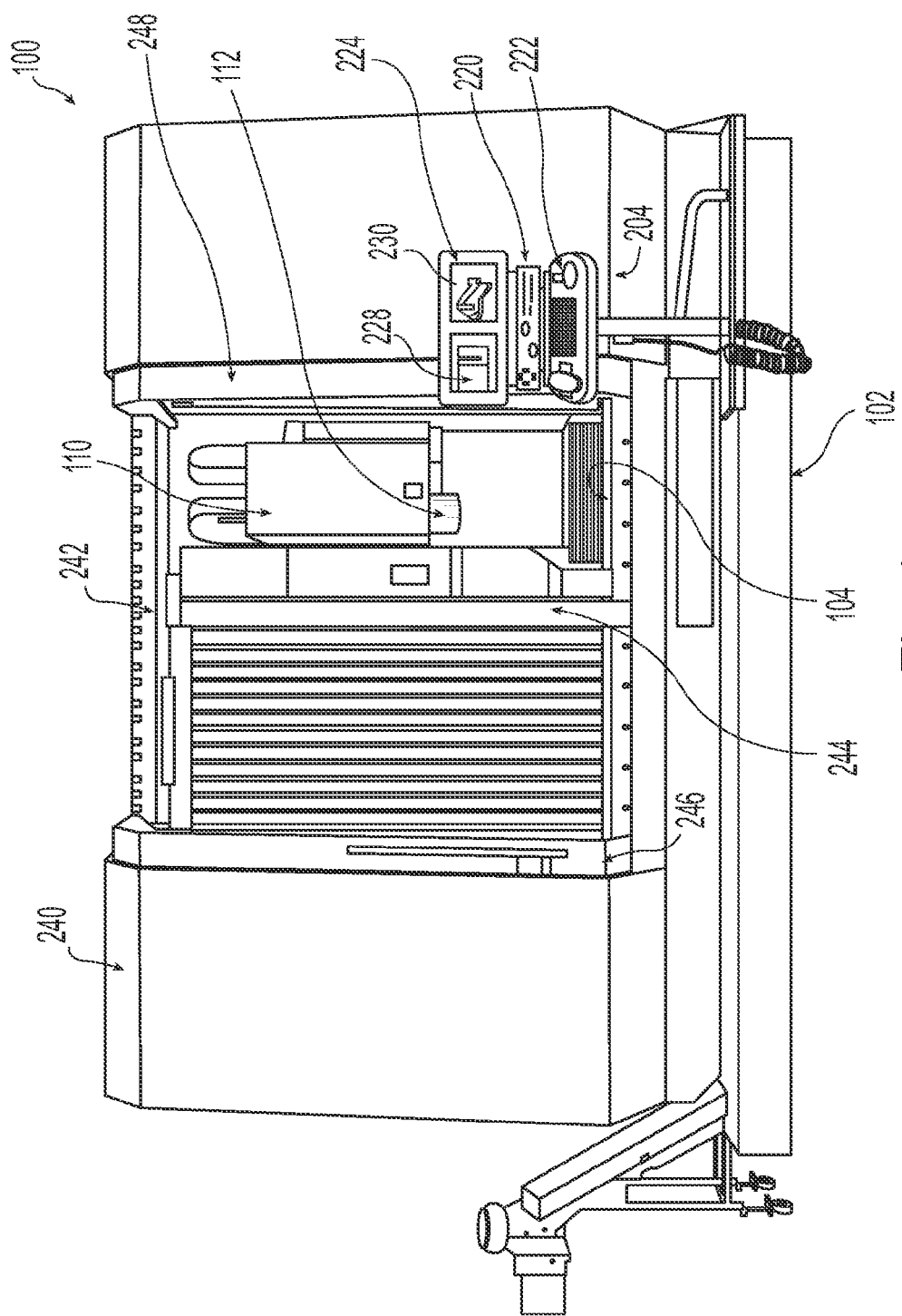
FIG. 1 illustrates an exemplary machine tool system.
Figure 2:
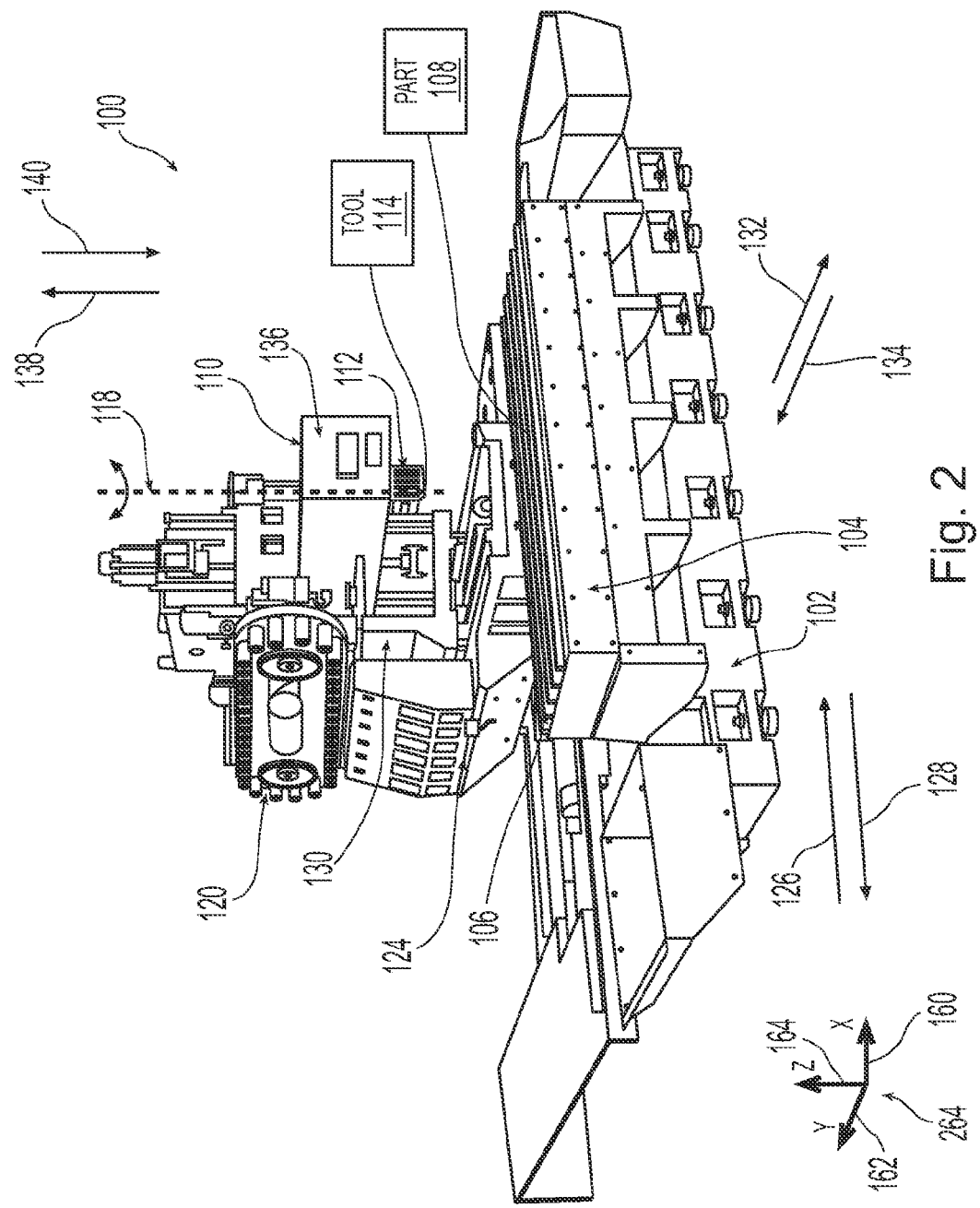
FIG. 2 illustrates portions of the machine tool system of FIG. 1.

Referring to FIG. 1, a machine tool system 100 is shown. Referring to FIG. 2, machine tool system 100 includes a frame 102 having a support 104 supported thereby. Support 104 includes a plurality of channels 106 which may be used to secure various accessories to support 104. Exemplary accessories include chucks to hold a part 108 to be machined and one or more types of rotary tables to support the part 108 and to orient the part 108.

Machine tool system 100 also includes a spindle column 110 which supports a tool spindle 112. Various tools 114 may be coupled to tool spindle 112 to perform various operations with machine tool system 100. Exemplary tools include and an end mill, a drill, a tap, a reamer, and other suitable tools. Tool spindle 112 is rotatable about a tool spindle axis 118 to input a rotation to the tool 114. In one embodiment, a plurality of tools 114 are stored in a tool carousal 120. Tool carousal 120 is supported by spindle column 110 and moves with spindle column 110. Additional details about exemplary tool carousals are provided in U.S. Provisional Application Ser. No. 60/821,481 and in U.S. Utility application Ser. No. 11/890,384, the disclosures of which are expressly incorporated by reference herein.

Spindle column 110 includes a first saddle 124 which is moveably coupled to frame 102. Saddle 124 is translatable in directions 126 and 128. A second saddle 130 is supported by first saddle 124. Saddle 130 is translatable in directions 132 and 134 relative to saddle 124. Directions 132 and 134 are orthogonal to directions 126 and 128. A third saddle 136 is supported by second saddle 130. Third saddle 136 is translatable in directions 138 and 140. Third saddle 136 supports tool spindle 112. In one embodiment, each of saddles 124, 130, and 136 are moveable by motors which are controlled by a motion control system 200 (See FIG. 3).

Figure 3:
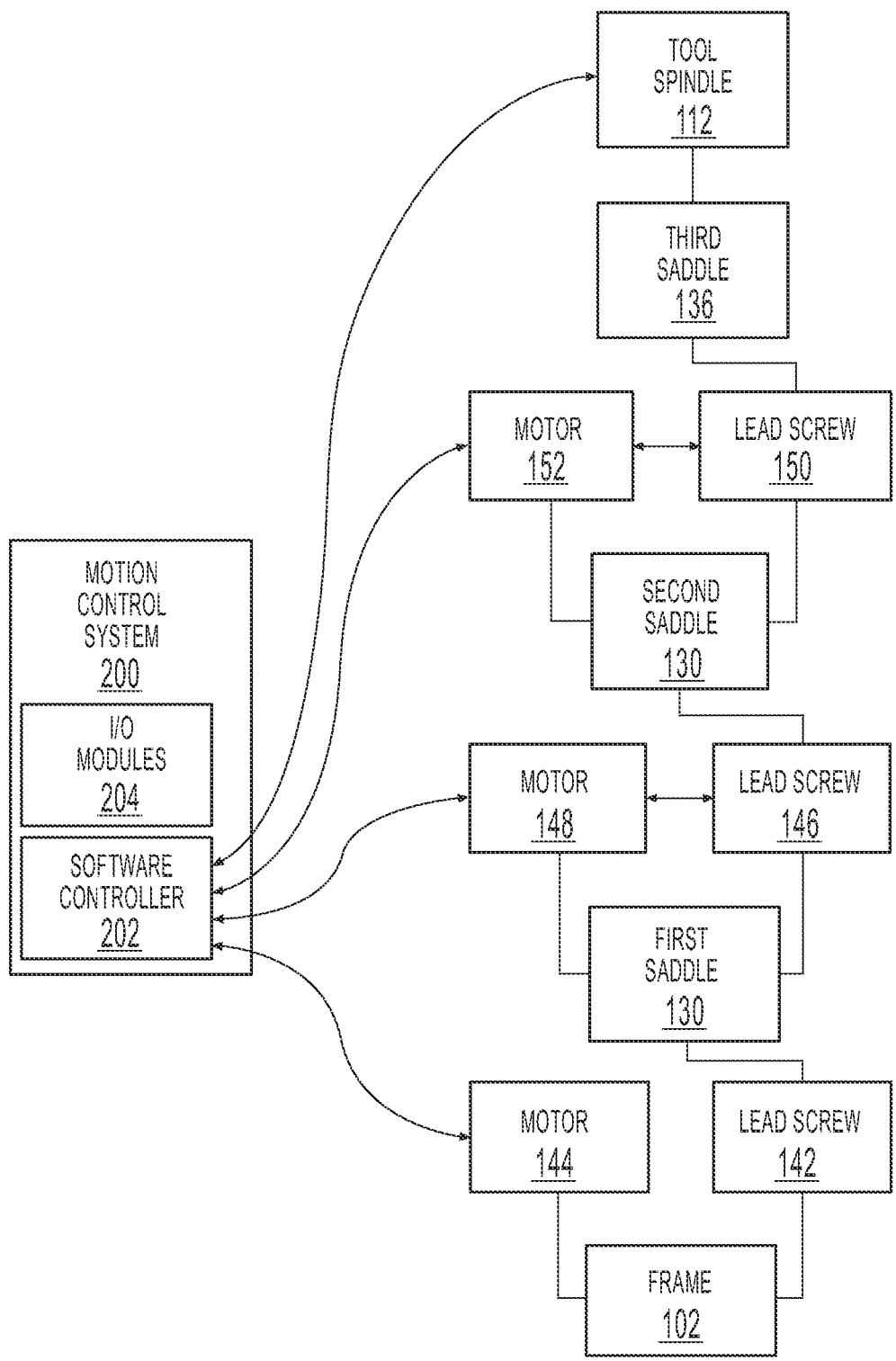
FIG. 3 illustrates a representation of the spindle column of the machine tool system of FIG. 1.

In one embodiment represented in FIG. 3, first saddle 124 is threadably coupled to a leadscrew 142 which is rotated by a motor 144 to move first saddle 124 and all that it supports in one of directions 126 and 128. Second saddle 130 is threadably coupled to first saddle 124 through a leadscrew 146. Leadscrew 146 is rotated by a motor 148 to move second saddle 130 and all that it supports in one of directions 132 and 134. Third saddle 136 is threadably coupled to second saddle 130 through a leadscrew 150. Leadscrew 150 is rotated by a motor 152 to move third saddle 136 and all that it supports in one of directions 138 and 140.

Motion control system 200 is operatively coupled to each of motor 144, motor 148, and motor 152 to control the movement of first saddle 124, second saddle 130, and third saddle 136, respectively. The movement of saddle 124 in direction 126 or direction 128 is illustrated as a movement in an x-axis 160 (See FIG. 2). The movement of saddle 130 in direction 132 or direction 134 is illustrated as a movement in a y-axis 162 (See FIG. 2). The movement of saddle 136 in direction 138 or direction 140 is illustrated as a movement in a z-axis 164 (See FIG. 2). Through the movement of one or more of the 3 axes of machine tool system 100, a tool 114 may be positioned relative to a part 108 supported by support 104 to be machined. Although a 3-axis machine tool system is illustrated, a 4 axis or 5 axis machine tool system may be implemented by adding a rotary axis between third saddle 130 and tool spindle 112 (a B-axis); adding a rotary table on top of support 104 (A-axis); and/or adding a tilt table on top of support 104 (C-axis).

Motion control system 200 includes a software controller 202 and one or more I/O modules 204. It should be understood that the methods disclosed herein may be executed by software controller 202 and be stored in a memory 324 (see FIG. 10) in a manner associated with software controller 202. Software controller 202 receives input data, such as a part program 116 (see FIG. 10) and a zone selection, and then provides output data, such as position data for the various axes 160, 162, and 164 of machine tool system 100.

I/O modules 204 provide an interface for an operator to enter information into machine tool system 100 and to receive information from machine tool system 100. Exemplary I/O modules 204 include input members, such as a user interface, a touch display, a keyboard, a mouse, one or more buttons or switches, a CD drive, a floppy drive, an interface to a network (wireless or wired), and other suitable devices for providing information to software controller 202 and output members, such as a display (such as a touch screen), lights, printer, and other suitable devices for presenting information from software controller 202.

Referring to FIG. 1, in the illustrated embodiment, I/O modules 204 include an operator console 220. Operator console 220 includes a plurality of input members 222 and a plurality of output members 224. Output members 224 include a first display screen 228 and a second display screen 230. The illustrated operator console 220 is the WINMAX control available from Hurco Companies, Inc., the assignee of the present application.

Machine tool system 100 includes a housing 240 which covers the support 104 and spindle column 110 described in connection with FIG. 2. The housing 240 includes an opening 242 which provides an operator access to a machine tool workspace 244. The opening may be closed through a first door 246 (shown open) and a second door 248 (shown open).

Figure 4:
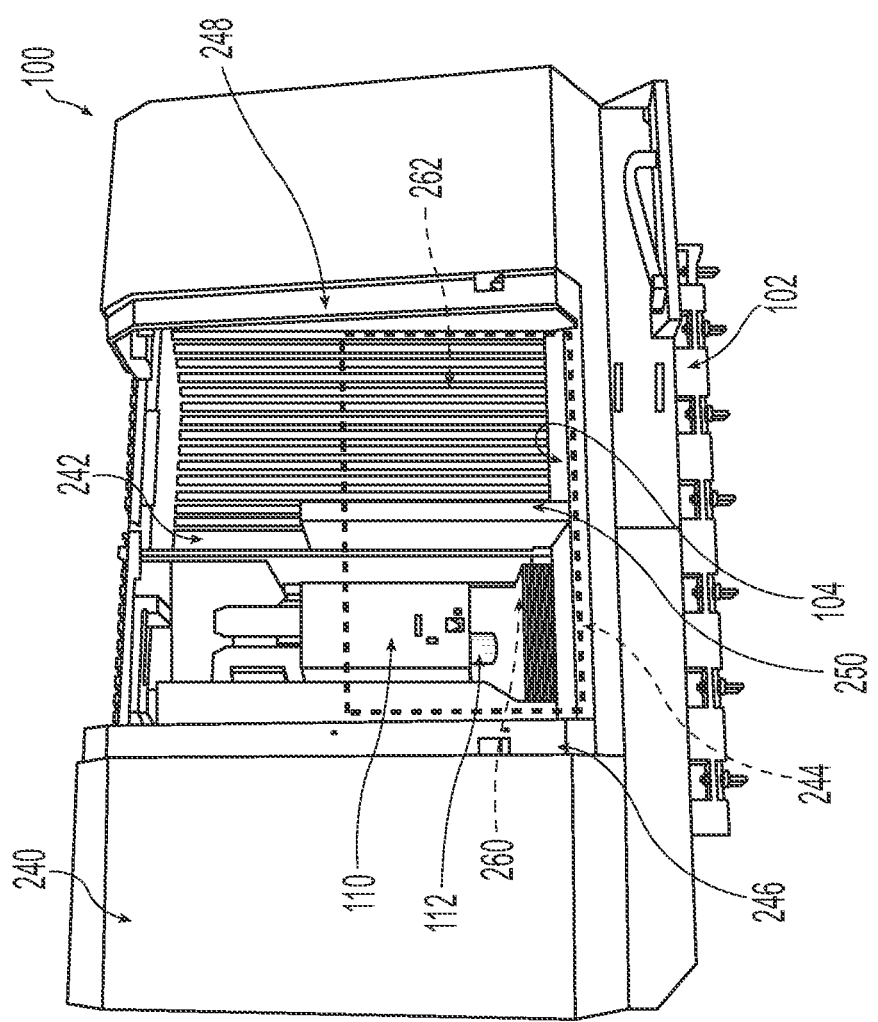
FIG. 4 illustrates a zone divider positioned in a workspace volume of the machine tool system of FIG. 1.
Figure 6:
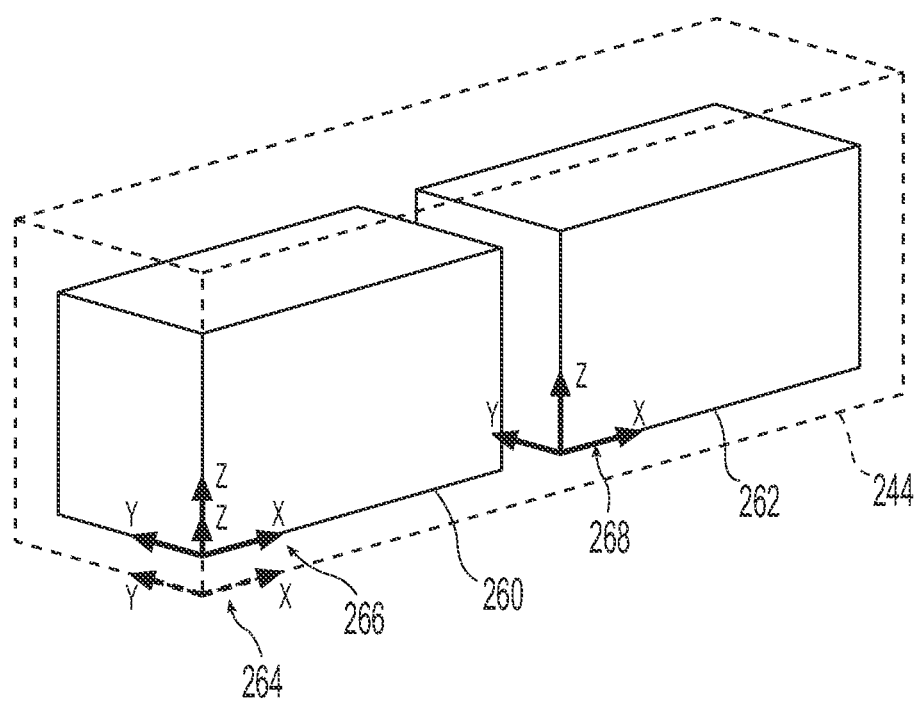
FIG. 6 illustrates the first zone and the second zone of FIG. 5.

Referring to FIG. 4, machine tool workspace 244 is shown with a zone divider member 250 positioned therein. As explained herein, machine tool system 100 may have its machine tool workspace 244 divided into multiple zones. Referring to FIG. 6, machine tool workspace 244 illustratively includes a first zone 260 and a second zone 262. Machine tool workspace 244 has a coordinate system 264 defined by x-axis 160, y-axis 162, and z-axis 164 of machine tool system 100. Coordinate system 264 is referred to as the reference machine coordinate system. In one embodiment, the reference machine coordinate system corresponds to the zero positions for all axes of the machine tool system. Each of zone 260 and zone 262 has a respective coordinate system 266 and 268 as well. These zones 260 and 262 and the coordinate systems 264, 266, and 264 may be defined in software executed by software controller 202. In one embodiment, the coordinate system for zone 260 coincides with the reference machine coordinate system.

Although two zones are illustrated, machine tool workspace 244 may be divided into any number of zones. In one embodiment, the machine tool workspace includes at least three zones. The illustrated zones 260 and 262 are shown as occupying separate regions of machine tool workspace 244. In one embodiment, the zones include an overlapping portion. The illustrated zones 260 and 262 are shown being spaced along x-axis 160. In one embodiment, a plurality of zones may be spaced on any combination of x-axis 160, y-axis 162, and z-axis 164 and one or more of zones may include overlapping regions.

Moreover, it should be understood that while the concept of a zone for a multi-zone machine tool is commonly considered to be a geometrically defined volume in Cartesian space defined with respect to the Machine Coordinate System as described above, the present disclosure extends the concept of a zone by defining it based on the kinematics of the machine tool. According to the present disclosure, zones may be defined by different axes kinematics sets, thereby providing a simple method to program and control various machine tool configurations. For example, a dual virtual zone machine may have a B-axis swivel head, and an A-axis table as well as a C-axis table. The machine is referred to as a virtual zone machine because there is no physical barrier separating the zones. Zone 1 would contain the XYZ, A, and B-axes, and zone 2 would share the XYZ, and B-axes, but have the C-axis instead of the A-axis. In another example, a large machine tool system is fitted with a plurality of rotary tables, such as six rotary tables, on its support. Each rotary table supports a given part to be machined. Each of the rotary tables may be considered to be in a separate virtual zone. The motion control system based on one or more part programs is able to machine the part in each virtual zone.

According to the present disclosure, zones may also be defined by limits specified for linear and rotary axes that are shared between sets of more than one zone. Zone limits are based on specified limits for shared axes between sets of more than one zone. For example, using the above described dual virtual zone machine tool with A- and C-axis rotary tables, the B-axis tilting head rotation limits can be interpolated dynamically for any part of the working range of the machine's other axes for each zone or even based on the current tool tip and tool orientation in with respect to the machine space. The B-axis limit is computed based on the worst-case interpolated limit positions of the specified limiting axes. The equation below is an example of B-axis limited by X, Y, and Z-axes.

For Zone 1:

$$B \text{ Axis Limit} = \text{Most Limiting Position} \begin{Bmatrix} X \text{ Interpolated Zone} \\ 1 \text{ Limit}(MachineX), \\ Y \text{ Interpolated Zone} \\ 1 \text{ Limit}(MachineY), \\ Z \text{ Interpolated Zone} \\ 1 \text{ Limit}(MachineZ) \end{Bmatrix}$$

where {MachineX, MachineY, MachineZ} is the current machine position. The concept is directly transferable to non-virtual multi-zone machines as well.

Figure 6A:
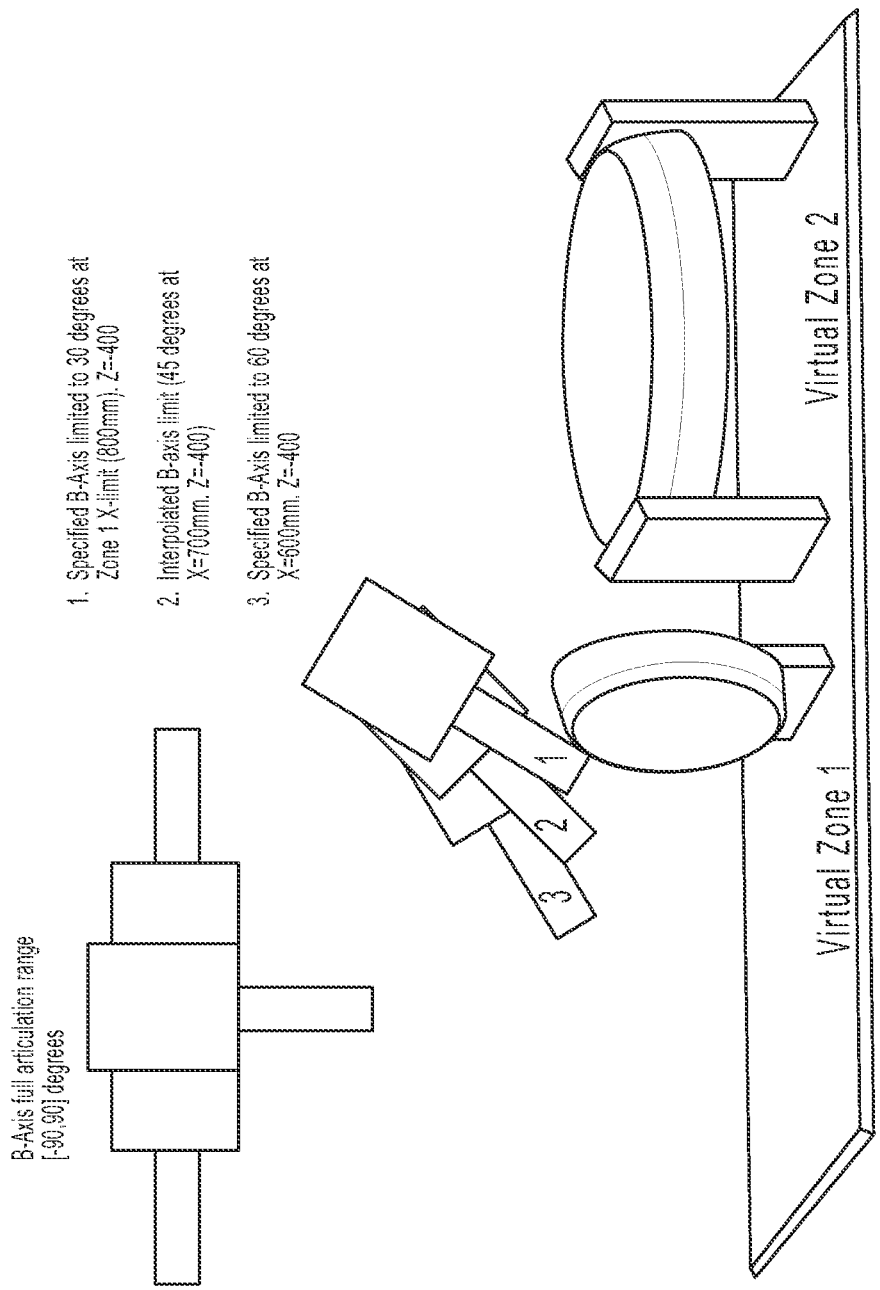
FIG. 6A illustrates the concept of zone limits.

FIG. 6A depicts a simplified example of the concept of zone limits. As shown, for Zone 1, the positive B-axis rotation can be limited for the working range of the X-axis based on the spindle body's proximity to the C-axis table of Zone 2 to prevent collision. For simplicity, interpolation of the B-axis limit based on Z-limits and the combination effect accounted for in the above equation is not shown. Similarly, for Zone 2, the negative B-axis rotation can be limited based on the working range of the X-axis based on the spindle body's proximity to the A-axis table of Zone 1. Other items may be taken into account to limit the rotation of the B-axis. By way of example, if a large workpiece is provided on the C-axis table the envelope of the workpiece is taken into account to prevent collision.

Barriers are usually placed between zones to deflect chips and coolant, which allows an operator to setup a part in a non-cutting zone while the machine is cutting in the opposite zone. A Dead-Zone is defined as the volume that the machine tool cannot cut in due to interference with the Barrier. The present disclosure uses an extended concept of Dead-Zone, referred to as Voids. Voids are analogous to the extended concept of Zone and Zone Limits for physical or virtual barriers. Voids are the set of blocked axes ranges for shared axes between zones. They are determined by computing the difference between the interpolated axes limit ranges between adjacent sets of Zones for each shared axis that is limited for any given machine position.

In the embodiment shown in FIG. 4, a physical divider 250 is included to illustrate the zones defined in software. Zone divider 250 permits an operator to work in one of the zones while the spindle column 110 is being controlled to cut a part 108 in the other zone. This reduces downtime of machine tool system 100 and as explained herein allows machine tool system 100 to be utilized with different kinematic setups in each of the zones. In one embodiment for the machining of larger parts, zone divider 250 is removed and the whole of machine tool workspace 244 is considered a single zone. In one embodiment, machine tool workspace 244 is about 80 inches along x-axis 160, about 26 inches along y-axis 162, and about 24 inches along z-axis 164 resulting in a volume of about 50,000 cubic inches. This space may be divided into zones 260 and 262, each having a space of about 30 inches along x-axis 160, about 26 inches along y-axis 162, and about 24 inches along z-axis 164 resulting in a volume of about 20,000 cubic inches.

Figure 12:
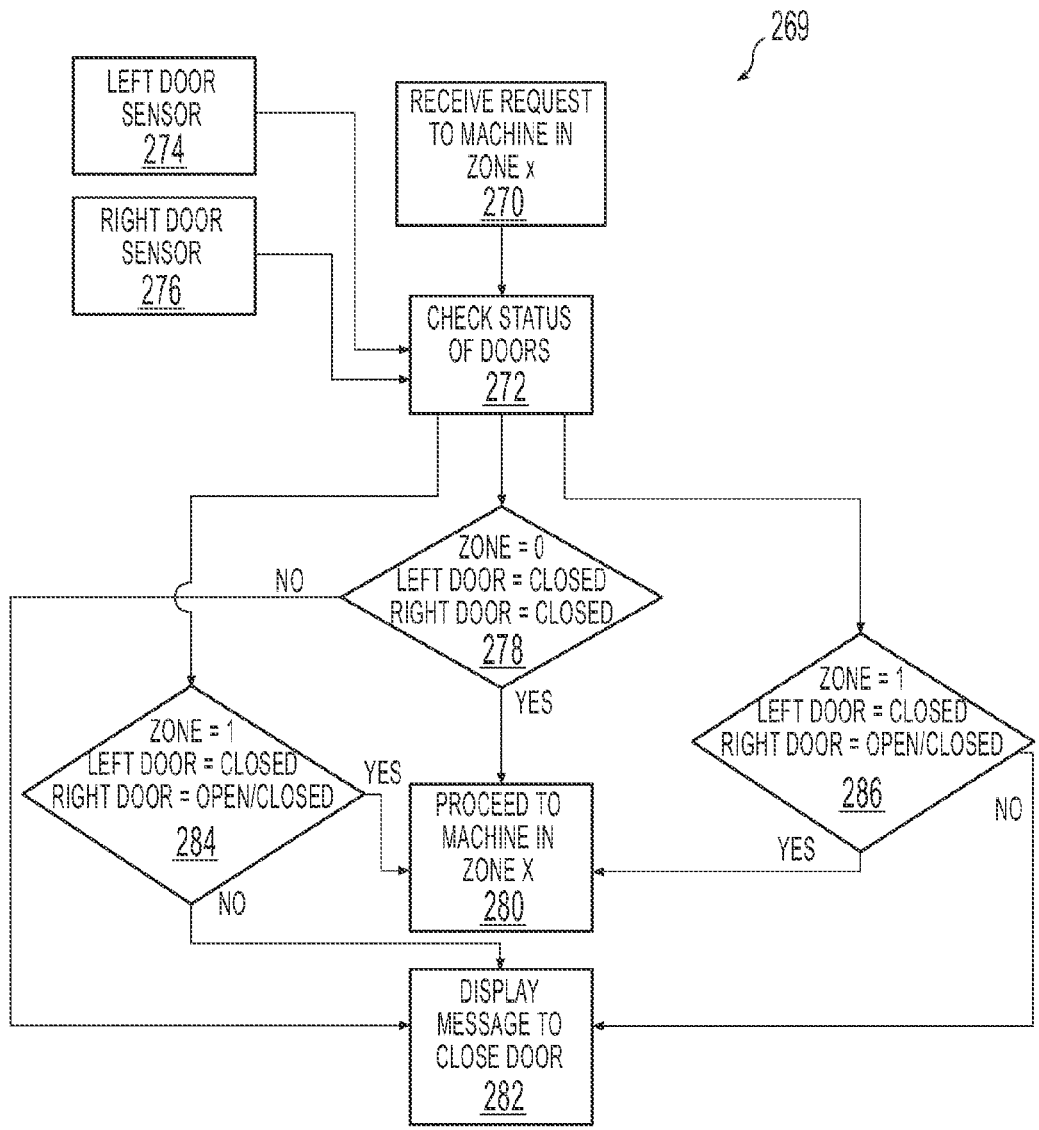
FIG. 12 illustrates a processing sequence related to the operation of the machine tool system of FIG. 1 based on a status of the doors of the machine tool system.

In one embodiment, the door (246 or 248) corresponding to the zone in which the spindle column 110 is actively being controlled to cut part 108 must be closed in order for spindle column 110 to be active. The door corresponding to a zone in which spindle column 110 is not actively being controlled does not need to be closed in order for spindle column 110 to be active in the other zone. Referring to FIG. 12, a processing sequence 269 of software controller 202 is shown. Software controller 202 receives a request to machine a part in a respective zone, as represented by block 270. In this example, zone 1 corresponds to zone 260, zone 2 corresponds to zone 262, and Zone 0 corresponds to all of machine tool workspace 244.

Software controller 202 checks the status doors 246 and 248, as represented by block 272. Software controller 202 receives an input from a left door sensor 274 associated with left door 246 and an input from a right door sensor 276 associated with right door 248. Exemplary door sensors include contact sensors. In one embodiment, the sensors are associated with door locks and sense whether the respective door is locked or unlocked. Based on the inputs from left door sensor 274 and right door sensor 276 and the requested zone, software controller 202 makes a determination whether machining should be permitted in the respective zone. In the case of Zone 0 (block 278), if both left door 246 and right door 248 are closed then machining in Zone 0 is permitted, as represented by block 280. However, if either left door 246 or right door 248 is open then machining in Zone 0 is not permitted, as represented by block 282. In the case of zone 1 (block 284), if left door 246 is closed then machining in zone 1 is permitted, as represented by block 280. However, if left door 246 is open then machining in zone 1 is not permitted, as represented by block 282. The state of right door 248 is not relevant to the decision. This permits the door to be closed or to be open allowing an operator access to zone 2. In the case of zone 2 (block 286), if right door 248 is closed then machining in zone 2 is permitted, as represented by block 280. However, if right door 248 is open then machining in zone 2 is not permitted, as represented by block 282. The state of left door 246 is not relevant to the decision. This permits the door to be closed or to be open allowing an operator access to zone 1.

Figure 5:
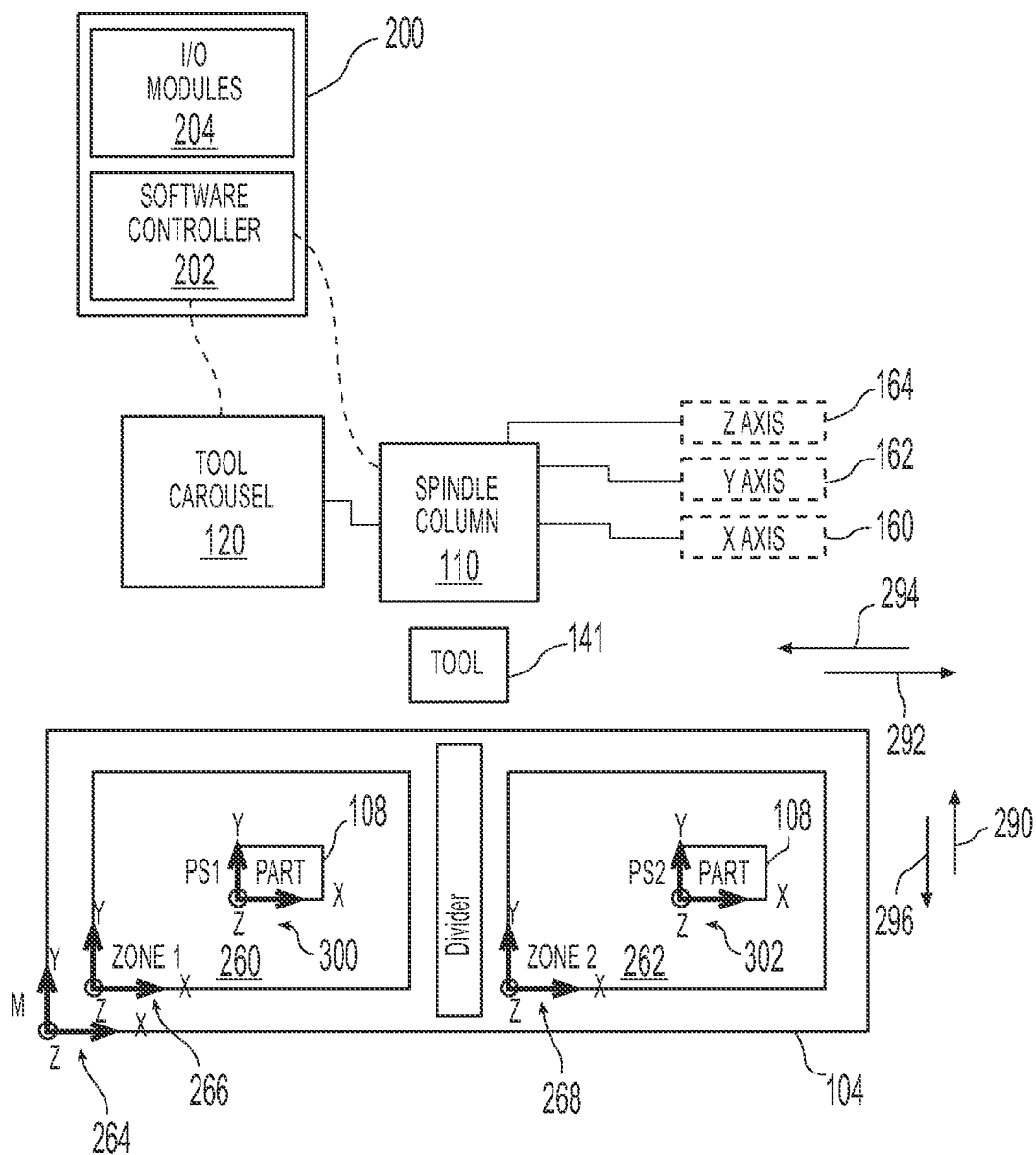
FIG. 5 is a representative view of the machine tool system of FIG. 1 with a zone divider provided between a first zone and a second zone.

Machine tool system 100 permits various machine kinematic configurations for the various portions of machine tool workspace 244. Referring to FIG. 5, machine tool system 100 is represented. Each of zone 260 and zone 262 are shown having a respective part 108 supported on support 104. Spindle column 110 moves between zone 260 and zone 262 by first moving in direction 290 to avoid contacting divider 250 and then in either direction 292, if moving to zone 262, or in direction 294, if moving to zone 260. Finally, spindle column 110 moves in direction 296 to machine the respective part 108. It should be noted that tool carousel 120 moves with spindle column 110 so that spindle column 110 does not have to move back to a stationary tool changer to change tools.

The part 108 in zone 260 is defined in its respective part program 116 based on a part coordinate system 300, which may include NC Work Offsets, the Part Setup, the Change Part Setup, and NC Work Offset calls as described herein. Exemplary NC Work Offset includes G-codes, such as G54, G55, G56, G57, G58, G59, and others. As explained herein, an operator locates part 108 relative to zone 260 based on a part setup which defines the offset from zone 1 coordinate system 266 to part coordinate system 300. The part 108 in zone 262 is defined in its respective part program 116 based on a part coordinate system 302. As explained herein, an operator locates that part 108 relative to zone 262 based on a part setup which defines the offset from zone 2 coordinate system 268 to part coordinate system 302.

Figure 7:
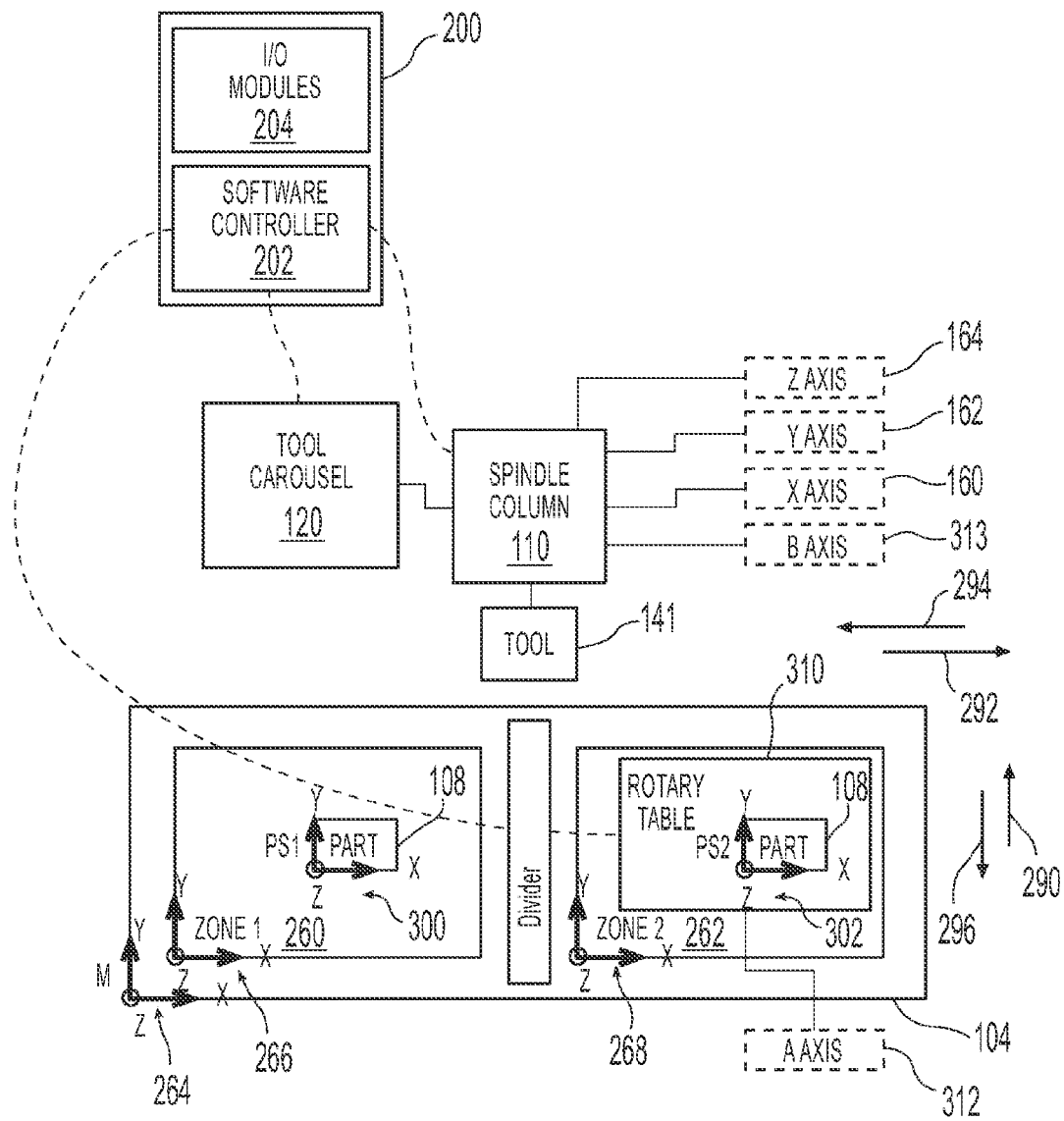
FIG. 7 is a representative view of the machine tool system of FIG. 1 with a zone divider provided between the first zone and the second zone and the second zone including a rotary table.

Referring to FIG. 7, zone 262 is shown having a different kinematics configuration than zone 260. A rotary table 310 has been added to support part 108 in zone 262. Rotary table 310 defines an A-axis 312 for machine tool system 100. As such, in zone 260 machine tool system 100 is a 3-axis machine tool system while in zone 262 machine tool system 100 is a 4-axis machine tool system. In one embodiment, a rotary arm is added to spindle column 110. The rotary arm provides a B-axis 313 to machine tool system 100. An exemplary machine tool system including a B-axis is provided in U.S. patent application Ser. No. 11/833,971, filed Aug. 3, 2007, titled "GENERALIZED KINEMATICS SYSTEM", the disclosure of which is expressly incorporated by reference herein. The addition of the B-axis 313 to the setup in FIG. 7 results in machine tool system being a 4-axis machine tool system in zone 260 and being a 5-axis machine tool system in zone 262.

Figure 8:
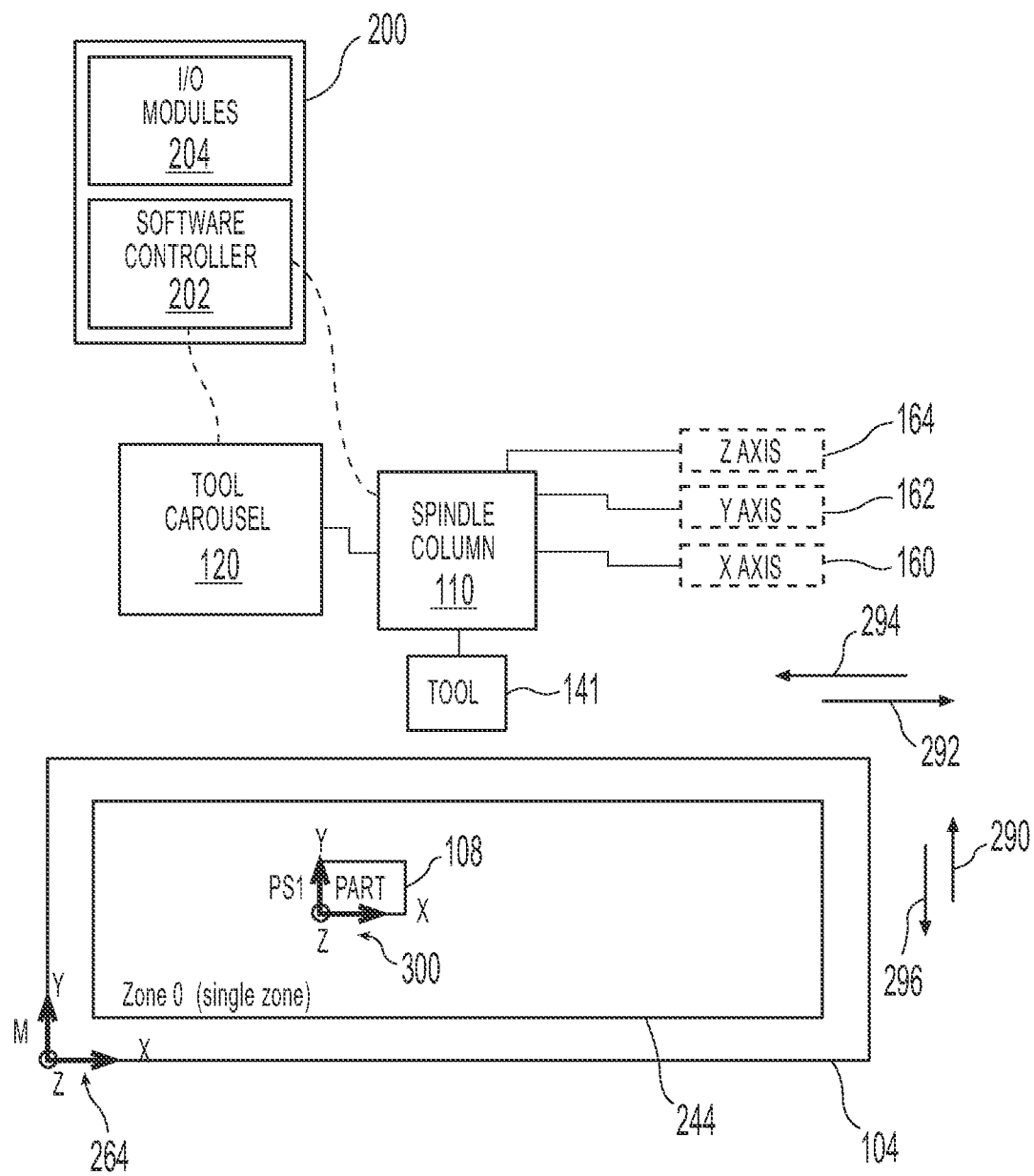
FIG. 8 is a representative view of the machine tool system of FIG. 1 having a single zone.

Referring to FIG. 8, the zone divider 250 has been removed and machine tool workspace 244 forms a single zone. This single zone permits the machining of larger parts 108. The part 108 in this single zone is defined in its respective part program 116 based on a part coordinate system 300. As explained herein, an operator locates part 108 relative to this single zone based on a part setup which defines the offset from the machine reference coordinate system 264 to part coordinate system 300.

Figure 9:
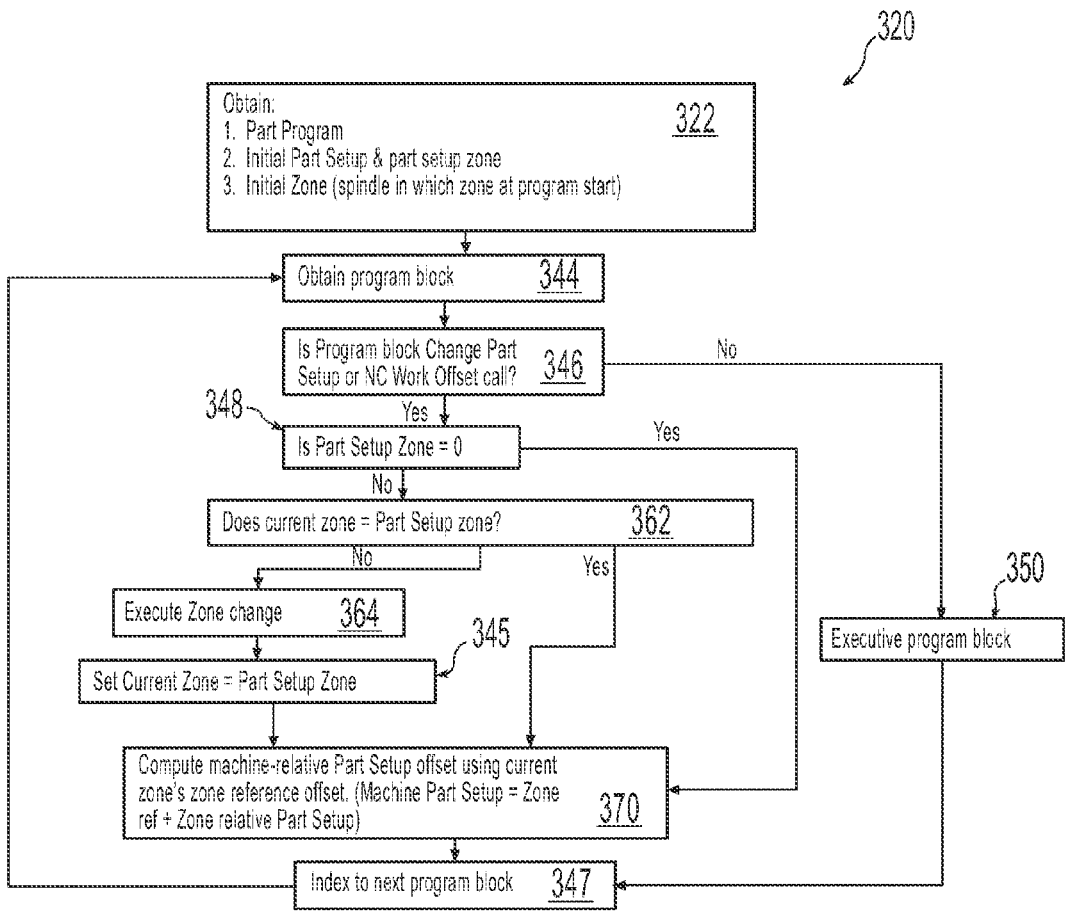
FIG. 9 illustrates a processing sequence of the motion control system of the machine tool system of FIG. 1.
Figure 10:
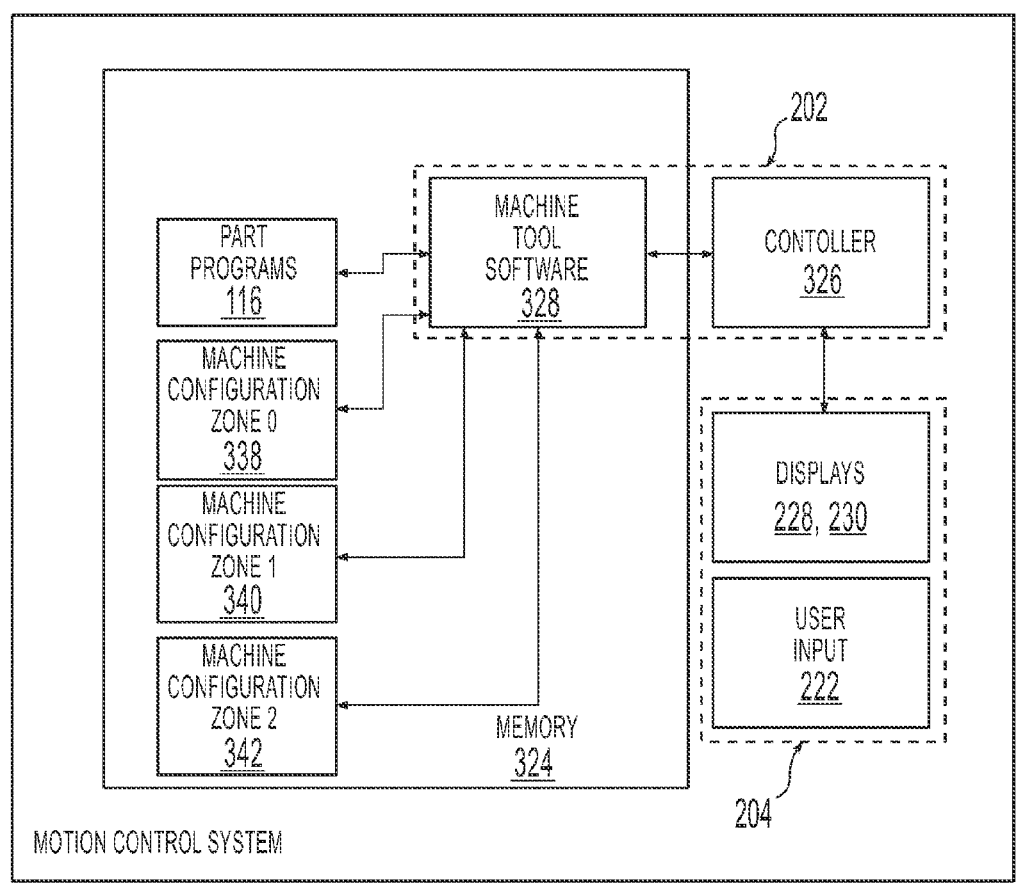
FIG. 10 is a representative view of portions of the motion control system of the machine tool system of FIG. 1.

Referring to FIG. 9, a processing sequence 320 for software controller 202 is shown. The software controller 202 obtains a part program 116 for execution, as represented by block 322. Referring to FIG. 10, the part program 116 is stored in a memory 324 accessible by software controller 202. As illustrated in FIG. 10, software controller 202 is a processor 326 which executes machine tool software 328. The machine tool software 328 provides instructions to the motors of machine tool system 100 and tool spindle 112 of machine tool system 100 to control the machining of part 108.

Returning to FIG. 9, in addition to part program 116, software controller 202 obtains the Initial Part Setup and the part setup zone, as well as the Initial Zone which indicates the zone occupied by the spindle at the start of part program 116. The Initial Part Setup is, in one embodiment, the first part setup executed by controller 202 when running a part program. During execution of part program 116, an NC work offset (or an NC auxiliary work offset) may be called or a Conversational Change Part Setup can be encountered. These operations may contain zone information requiring a zone change.

After all of elements of block 322 are determined, software controller 202 obtains the first program block from part program 116 as indicated by block 344. Next, software controller 202 determines whether the current program block includes a Change Part Setup operation or an NC Work Offset call as indicated by block 346. If either of these items are included in the program block, then software controller 202 proceeds to block 348, which is described below. If not, then software controller 202 executes the program block (i.e., performs the operation specified by the program block such as a cutting operation) as indicated by block 350. When execution of the program block is complete, software controller 202 proceeds to the next program block in part program 116 as indicated by block 347 and the return arrow to block 344. Program blocks may be single commands or multiple commands grouped together.

After either a Change Part Setup or NC Work Offset call are identified in block 344, software controller 202 determines whether the Part Setup specifies Zone 0 as indicated in block 348. If so, control is transferred to block 370 wherein software controller 202 computes a machine-relative Part Setup offset using the zone reference offset of the current zone according to the relationship:

Machine Relative Part Setup Offset=Zone reference+ zone relative Part Setup.

After computing the machine-relative Part Setup offset, software controller 202 proceeds to the next program block as indicated by block 347 and the return arrow to block 344.

If the Part Setup is not Zone 0, the software controller 202 determines whether the current zone is the same as the Part Setup zone as indicated by block 362. If these zones match, then software controller 202 performs the machine-relative Part Setup offset computation described above with reference to block 370 and proceeds to the next programming block. If the current zone is not the same as the Part Setup zone, then software controller 202 performs a zone change at block 364. After the zone change is complete, software controller 202 sets the current zone equal to the Part Setup zone at block 345 and performs the machine-relative Part Setup offset computation described above before indexing to the next program block.

In the above-described manner, software controller 202 computes the Part Setup with respect to the machine coordinate system "on-the-fly" during program execution. As such, the motion control system may still perform as a single-zone machine. All motion data sent to the motion system is in terms of machine referenced data.

In one embodiment, the above-described zone information may be provided in part program 116. In one embodiment, this zone information (including spindle position within the machine) is input through I/O modules 204. In one embodiment, this zone information is provided as part of a Part Setup portion of part program 116 which is entered as part of a conversational program. Further zone information may be provided through the NC Work Offsets and the Change Part Setup operations which may be encountered during execution of part program 116.

Figure 11:
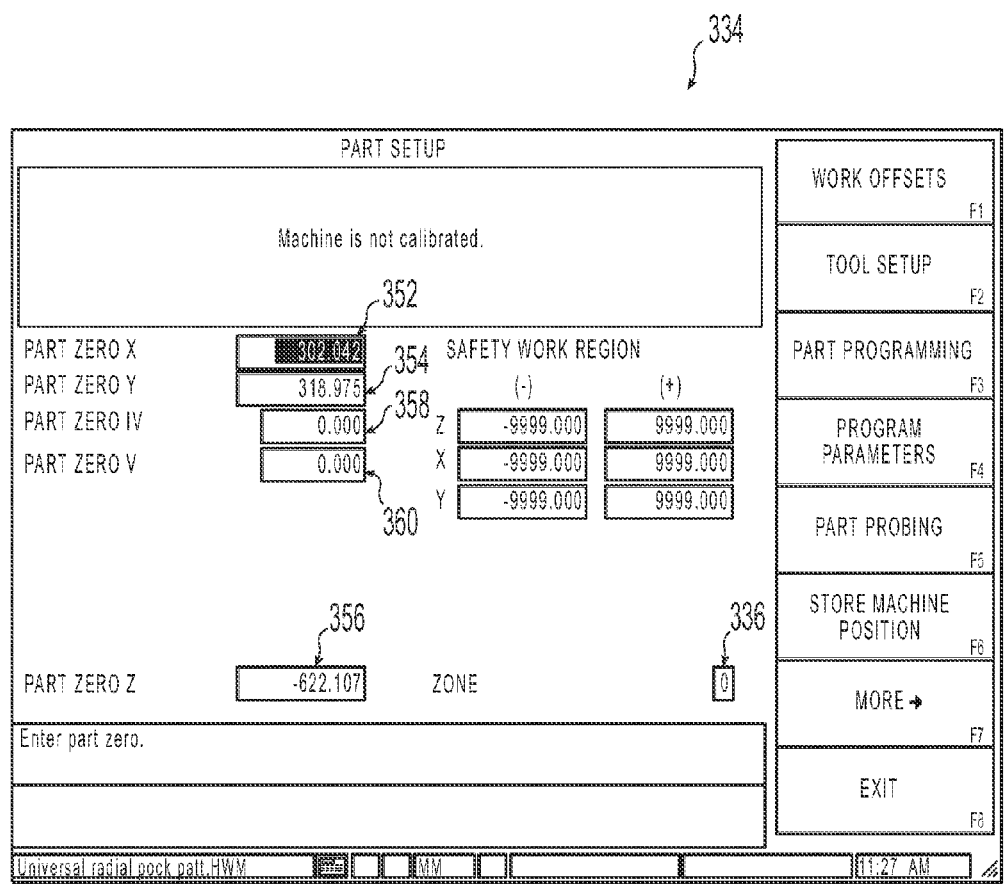
FIG. 11 illustrates a part setup interface of an operator interface of the motion control system of the machine tool system of FIG. 1.

Referring to FIG. 11, an exemplary part setup input screen 334 is shown. Part setup input screen 334 is displayed on display 228 of operator console 220. Part setup input screen 334 includes a zone identification input 336. Software controller 202 has access to machine configurations for each of the zones setup for machine tool system 100. As stated herein, machine tool system 100 may have any number of zones. In the illustrated embodiment, three zones are discussed Zone 0, zone 1 262, and zone 2 264. Zone 0 may correspond to all of the machine tool workspace 244. Zone 0 may identify any zone (zone 1 or zone 2) or a single zone on single zone machines. A function of Zone 0 is to permit importation of programs and NC states from single-zone machines to dual-zone machines, and vice-versa. More specifically, all zone 1 and 2 information from dual-zone program setups loaded into single-zone machines are set to zone 0, all single zone program setups loaded into dual zone machines are set to zone 0, and all dual zone program setups loaded into dual zone machines are preserved.

Referring to FIG. 10, for each of these three zones software controller 202 has access to machine configuration information. Machine configuration information 338 corresponds to zone 0 and is selected based on a 0 being provided through input 336 (see FIG. 11). Machine configuration information 340 corresponds to zone 1 and is selected based on a 1 being provided through input 336 (see FIG. 11). Machine configuration information 342 corresponds to zone 2 and is selected based on a 2 being provided through input 336 (see FIG. 11).

The machine configuration information includes information regarding the kinematics of the respective zone and also the location of the zone coordinate system. The location of the zone coordinate system being given as an offset from the machine reference coordinate system. In one embodiment, the machine configuration information includes a complete kinematics model of the machine tool system for the respective zone including any additional axis of the respective zone. In one embodiment, the machine configuration information provides the relationships between the various axes of the machine tool system for the respective zone which are used by software controller 202 to generate a kinematics model for the respective zone as explained in U.S. patent application Ser. No. 11/833,971, filed Aug. 3, 2007, titled "GENERALIZED KINEMATICS SYSTEM", the disclosure of which is expressly incorporated by reference herein.

Referring to FIG. 11, a first input 352 may be provided for an offset in the x-axis, a second input 354 may be provided for an offset in the y-axis, and a third input 356 may be provided for an offset in the z-axis. Inputs 358 and 360 are also provided for offsets for any rotary axis or tilt axis (A, B, or C). In one embodiment, offsets IV and V represent the axis in ascending alphabetical order. For example, if the zone included a B-axis and a C-axis, the offset IV would correspond to the B-axis and offset V would correspond to the C-axis.

As illustrated in FIG. 5, zone 1 is a three-axis machine tool system. As such, the part setup information for zone 1 need only provide offsets from the zone coordinate system (zone 1 coordinate system 266) to the part coordinate system 300 in the x-axis (input 352 in FIG. 11), y-axis (input 354 in FIG. 11), and z-axis (input 356 in FIG. 11). Also as illustrated in FIG. 5, zone 2 is a three-axis machine tool system. As such, the part setup information for zone 2 need only provide offsets from the zone coordinate system (zone 2 coordinate system 268) to the part coordinate system 302 in the x-axis (input 352 in FIG. 11), y-axis (input 354 in FIG. 11), and z-axis (input 356 in FIG. 11). A different configuration for zone 2 is illustrated in FIG. 7. Referring to FIG. 7, a rotary table 310 has been added making zone 2 a four-axis machine tool system. As such, the part setup information for zone 2 provides offsets from the zone coordinate system (zone 2 coordinate system 268) to the part coordinate system 302 in the x-axis (input 352 in FIG. 11), y-axis (input 354 in FIG. 11), and z-axis (input 356 in FIG. 11), and a first rotary axis, the A-axis, (input 358 in FIG. 10).

Once the part 108 is located relative to machine tool system 100, part program 116 may be executed as represented by block 350 (in FIG. 9). In one embodiment, the part program 116 is entered through a conversational mode of operation whereby a user during a programming session is presented with one or more screens through a user interface (such as a touch screen and keyboard). During the programming session, the user may program the desired geometry for the machined part and specify one or more attributes. In one example, the user specifies the desired geometry for the machined part by creating blocks of code each of which specifies a tool and a trajectory of the tool. As such, the geometry of the machined part is defined based on the operations used to create the machined part. An exemplary method of conversational programming is disclosed in U.S. Patent Application Ser. No. 61/171,827, filed Apr. 22, 2009, titled "UNIVERSAL CONVERSATIONAL PROGRAMMING FOR MACHINE TOOL SYSTEMS", and U.S. Patent Application Ser. No. 61/171,963, filed Apr. 23, 2009, titled "UNIVERSAL CONVERSATIONAL PROGRAMMING FOR MACHINE TOOL SYSTEMS", the disclosures of which are expressly incorporated by reference herein. The conversational programming disclosed in the UNIVERSAL CONVERSATIONAL PROGRAMMING FOR MACHINE TOOL SYSTEMS applications provides a programming arrangement which is not machine specific, but rather specifies the tools and tool vectors for machining the part.

In one embodiment, the part program is provided through an NC mode of operation whereby an NC program is loaded into software controller 202. Part programs are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part.

Regardless of the origin of the part program, the part program defines the desired geometry for the machined part either directly or based on the operations used to create the part.

Figure 13:
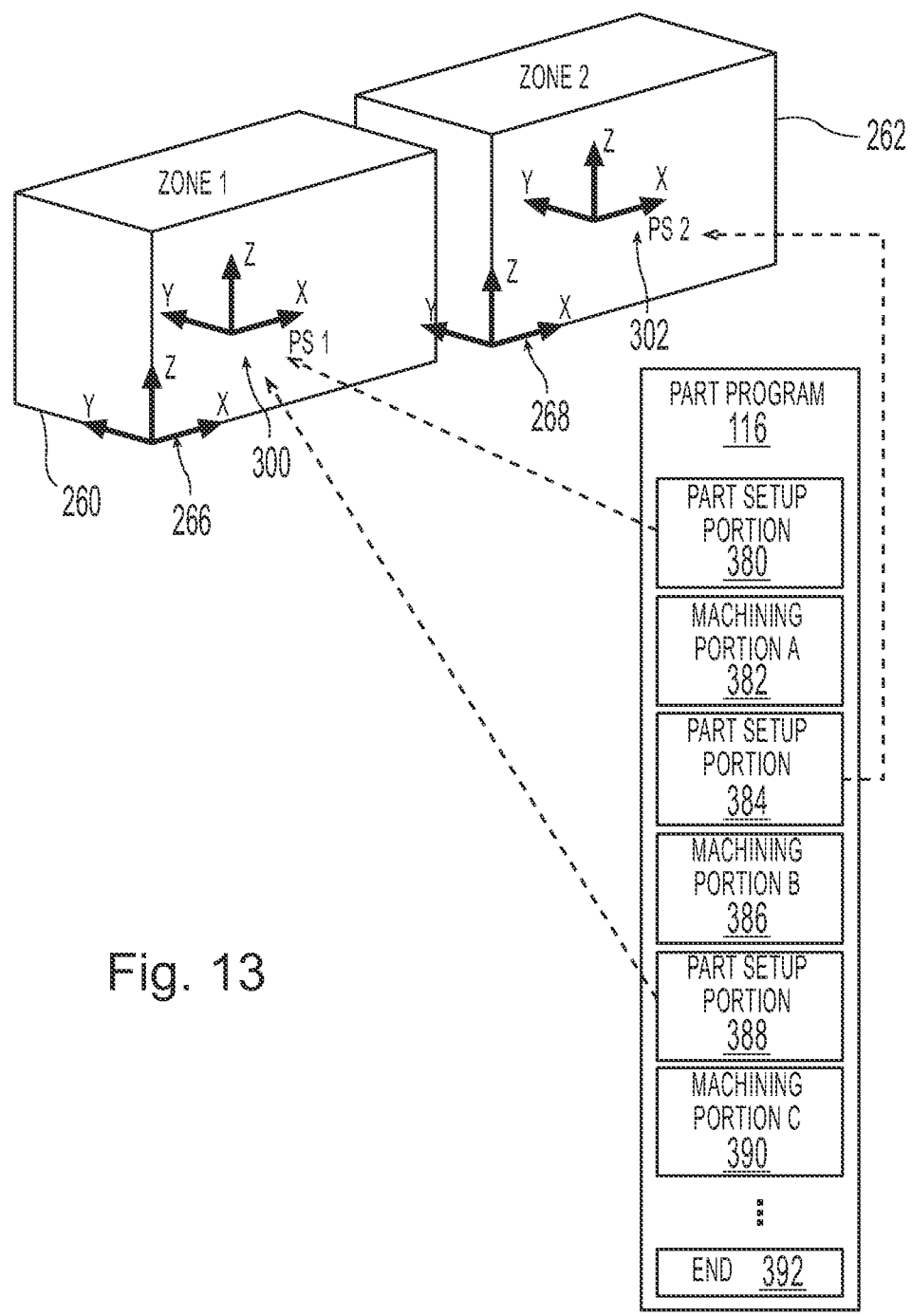
FIG. 13 illustrates a processing sequence of the machine tool system wherein a part program being executed by the machine tool system includes portions related to machining in a first zone of the machine tool system and portions related to machining in a second zone of the machine tool system.

Referring to FIG. 13, in one embodiment, machine tool system 100 may switch between zones of the machine workspace 244 during the execution of a part program 116. In the illustrated example, part program 116 includes a first part setup portion, represented by block 380, which identifies zone 1 as the active zone and provides the required offsets from zone 1 coordinate system 266 to part coordinate system 300. Part program 116 also includes a first machining portion, represented by block 382, which includes one or more machining steps for a first part 108 to be performed by machine tool system 100. Part program 116 also includes a second part setup portion, represented by block 384, which identifies zone 2 as the active zone and provides the required offsets from zone 2 coordinate system 268 to part coordinate system 302. Part program 116 also includes a second machining portion, represented by block 386, which includes one or more machining steps for a second part 108 to be performed by machine tool system 100. As such, machine tool system 100 has switched between zone 1 and zone 2 during the execution of a part program 116. In situations wherein zone 1 and zone 2 have a different kinematic configuration, machine tool system 100 has also switched between two kinematic distinct machines during the execution of the part program 116. The switching between zone 1 and zone 2 may continue during the execution of the part program 116 (see blocks 388 and 390) until the part program 116 is completed, as represented by block 392.

In one embodiment, a method of machining a plurality of parts with a machine tool system is provided. The method comprising the steps of: positioning a first part in a first region of a machine tool workspace of the machine tool system; positioning a second part in a second region of the machine tool workspace of the machine tool system; machining the first part in the first region of the machine tool workspace with at least one tool supported by a tool spindle of the machine tool system; and machining the second part in the second region of the machine tool workspace with at least one tool supported by the tool spindle of the machine tool system, wherein the machine tool system has a first kinematics arrangement in the first region while machining the first part and a second kinematics arrangement in the second region while machining the second part.

In one example, the first kinematics arrangement is different from the second kinematics arrangement. In one variation, the first kinematics arrangement and the second kinematics arrangement have the same number of moveable axes. In a further refinement thereof, the first kinematics arrangement and the second kinematics arrangement are each at least a four axis machine tool system. In another refinement thereof, the first kinematics arrangement and the second kinematics arrangement are each at least a five axis machine tool system.

In another example, the first kinematics arrangement has a first number of moveable axes and the second kinematics arrangement has a second number of moveable axes, the second number being different than the first number. In a variation thereof, the first kinematics arrangement is a three axis machine tool system and the second kinematics arrangement is a four axis machine tool system. In another variation, the first kinematics arrangement is a three axis machine tool system and the second kinematics arrangement is a four axis machine tool system.

In yet another example, the first region is a first zone and which has a first zone coordinate system and the second region is a second zone which has a second zone coordinate system. In a variation thereof, the first zone and the second zone are virtual zones. In another variation thereof, the first zone and the second zone are physical zones.

In still another example, the first region is a first zone and which has a first zone coordinate system and the second region is a second zone which has a second zone coordinate system. In a refinement thereof, the method further comprises the steps of specifying a first offset from the first zone coordinate system to the first part; specifying a second offset from the second zone coordinate system to the second part; and during the steps of machining the first part and the second part, switching between the first zone and the second zone.

In another embodiment, an apparatus for machining a plurality of parts with at least one tool is provided. The apparatus comprising: a frame; a support supported by the frame, the support supporting a first part in a first zone of a plurality of selectable zones associated with the support and a second part in a second zone of the plurality of selectable zones associated with the support, each of the plurality of selectable zones being located within a machining workspace of the apparatus; a machine tool spindle supported by the frame and moveable relative to the part, the machine tool spindle adapted to couple the at least one tool, at least one of the support and the machine tool spindle including a plurality of moveable axes which position the at least one tool relative to the first part and the second part; and a motion control system operably coupled to at least one of the machine tool spindle and the support. The motion control system executing the machining of the first part and the second part through a controlled movement of the plurality of moveable axes. The first zone has a first number of moveable axes controlled by the motion control system to machine the first part and the second zone has a second number of moveable axes controlled by the motion control system to machine the second part, the first number of moveable axes being kinematically different from the second number of moveable axes.

In one example, the second number of moveable axes has a different number of axes compared to the first number of moveable axes. In another example, the controlled movement of the plurality moveable axes is based on a part program which includes instructions related to the machining of the first part and the second part. In a refinement thereof, the part program includes at least a first part setup portion, a first machining portion, a second part setup portion, a second machining portion, a third part setup portion, and a third machining portion, each of the part setup portions specifying which zone in which to position the tool spindle. In a further refinement thereof, the first part setup portion specifies the first zone and the first machining portion includes machining instructions relative to the first part. In still a further refinement, the second part setup portion specifies the second zone and the second machining portion includes machining instructions relative to the second part. In yet still a further refinement, the third part setup portion specifies the first zone and the third machining portion includes machining instructions relative to the first part.

In yet another embodiment, an apparatus for machining a part with at least one tool is provided. The apparatus comprising: a frame; a support supported by the frame, the support supporting the part in one of a plurality of selectable zones associated with the support, each of the plurality of selectable zones being located within a machining workspace of the apparatus; a machine tool spindle supported by the frame and moveable relative to the part, the machine tool spindle adapted to couple the at least one tool, at least one of the support and the machine tool spindle including a plurality of moveable axes which position the at least one tool relative to the part; and a motion control system operably coupled to at least one of the machine tool spindle and the support. The motion control system executing the machining of the part through a controlled movement of the plurality of moveable axes, wherein the controlled movement of the plurality moveable axes is based on a part program which includes instructions related to the machining of the part and a selection of a first zone of the selectable zones associated with the support.

In the art, Multi-zone machine tools have been restricted to a single rotary table in one zone or indexing tables in both zones. Indexing tables do not permit simultaneous interpolated control of the indexed rotary axes with the other interpolated controlled axes (e.g. xyz axes of a machine tool), which limits the machine tools capabilities. Multi-zone machine tools are often very large and hence, it is impractical to use rotary tables to rotate the part. Instead, these machines employ rotary axes on the spindle head to orient the tool with respect to the stationary workpiece.

In one embodiment of the present disclosure, a multi-zone machine tool including multiple rotary tables that have fully controlled axes that are simultaneously interpolated with the other interpolated and controlled axes of the machine tool is provided. Each of the axes are under the control of a motion control system 200. As such, all of the axes may be simultaneously interpolated by the motion control system 200. That said, for a given operation the motion control system 200 may only need to interpolate less than all of the axes to perform the operation. For example, the motion control system 200 may only need to interpolate angles for an A axis while maintaining all other axes constant. Although not being interpolated, the other axes are still subject to the control of the motion control system and may be interpolated for additional operations.

Figure 14:
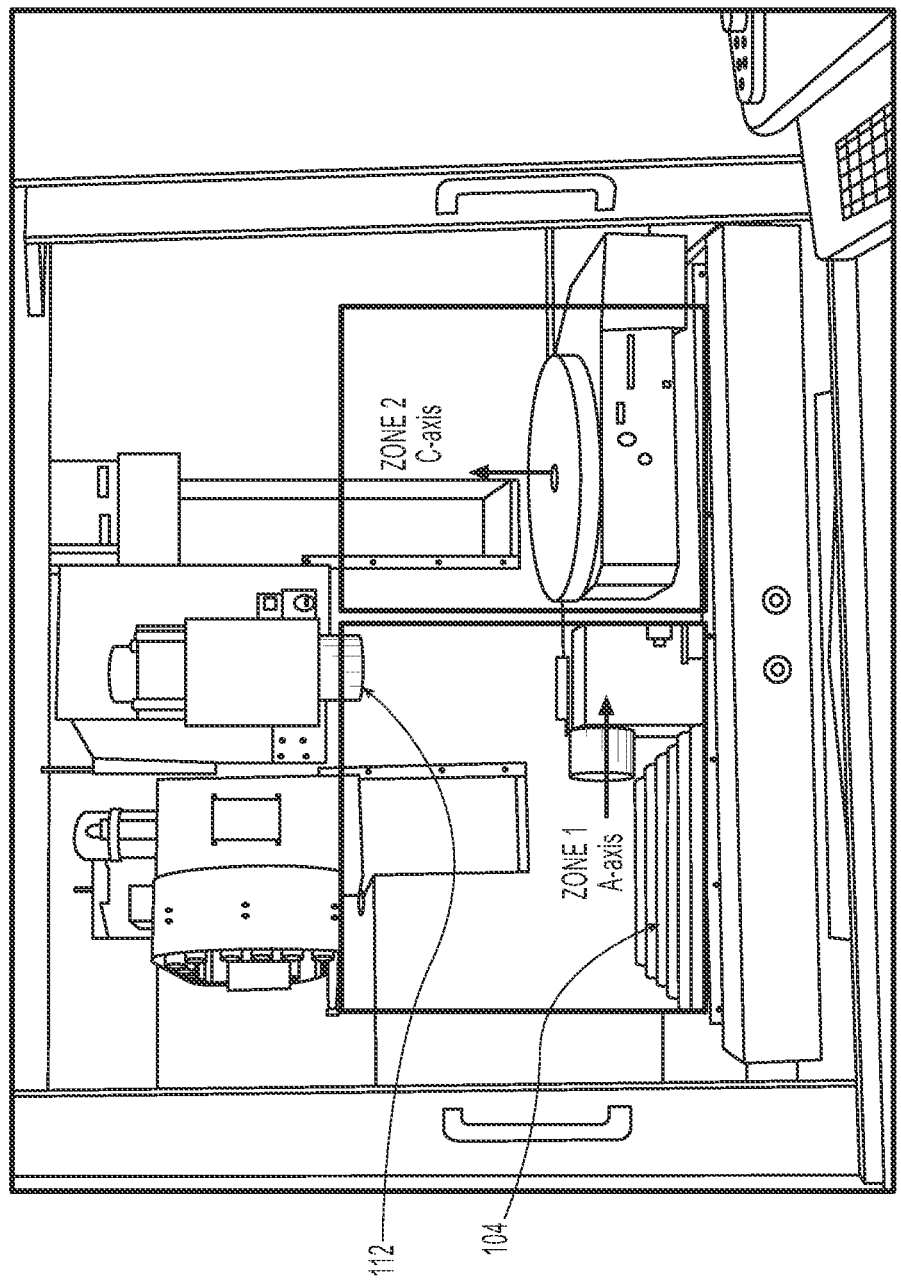
FIG. 14 illustrates a machine tool system having multiple rotary tables.

Furthermore, the multiple rotary tables may be identical or have different configurations as shown in FIG. 14. FIG. 14 illustrates a dual zone machine having a Rotary A-axis table in Zone #1 and a Rotary C-axis in Zone #2. The multi-zone machine tool may have zones that are separated by a physical barrier or it may have virtual zones as described herein and as shown in FIG. 14. The machine tool system is not limited to rotary and compound rotary tables, but may have any number of rotary axes.

Figure 15:
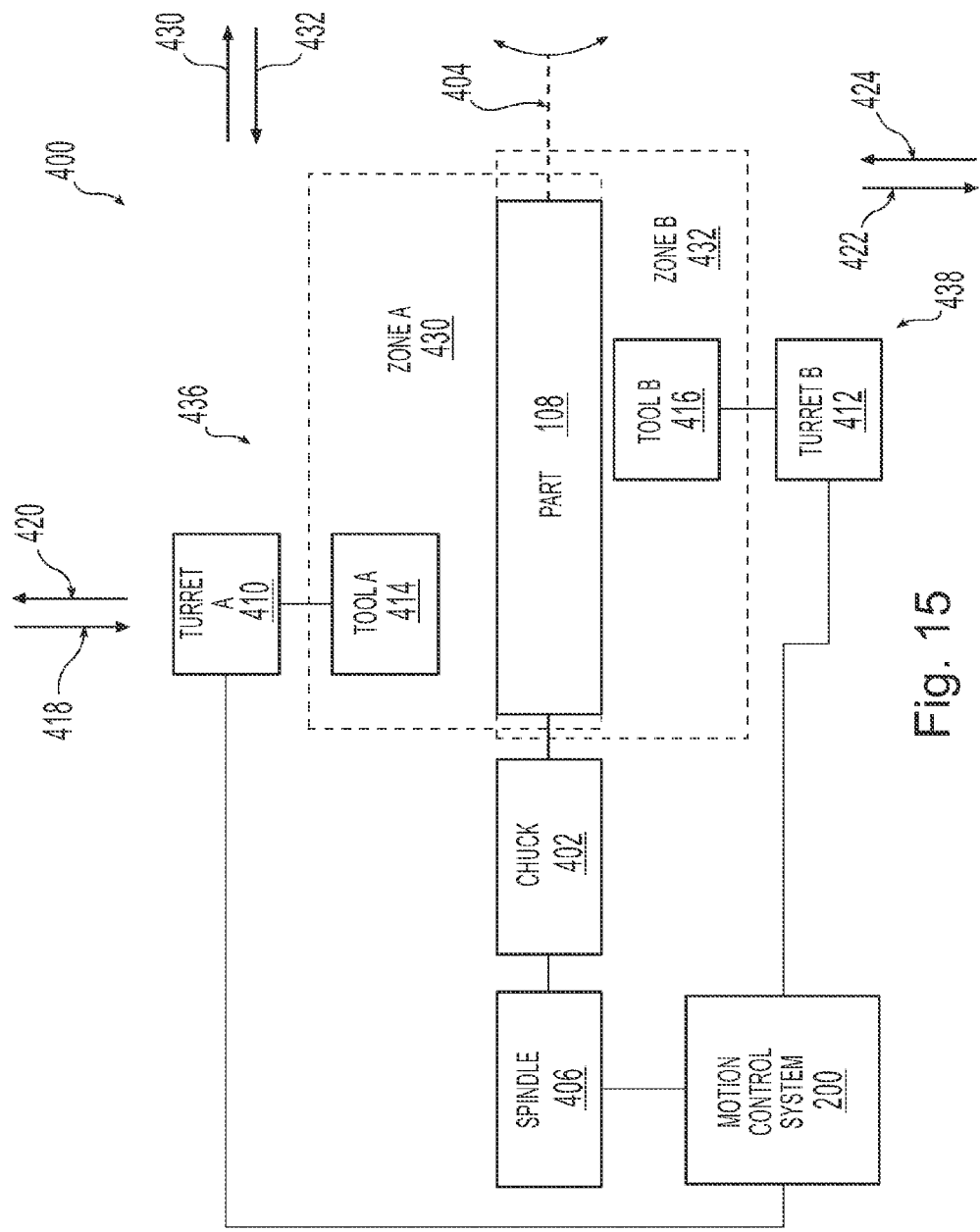
FIG. 15 illustrates an exemplary multi-interface machine tool system.
Figure 16:
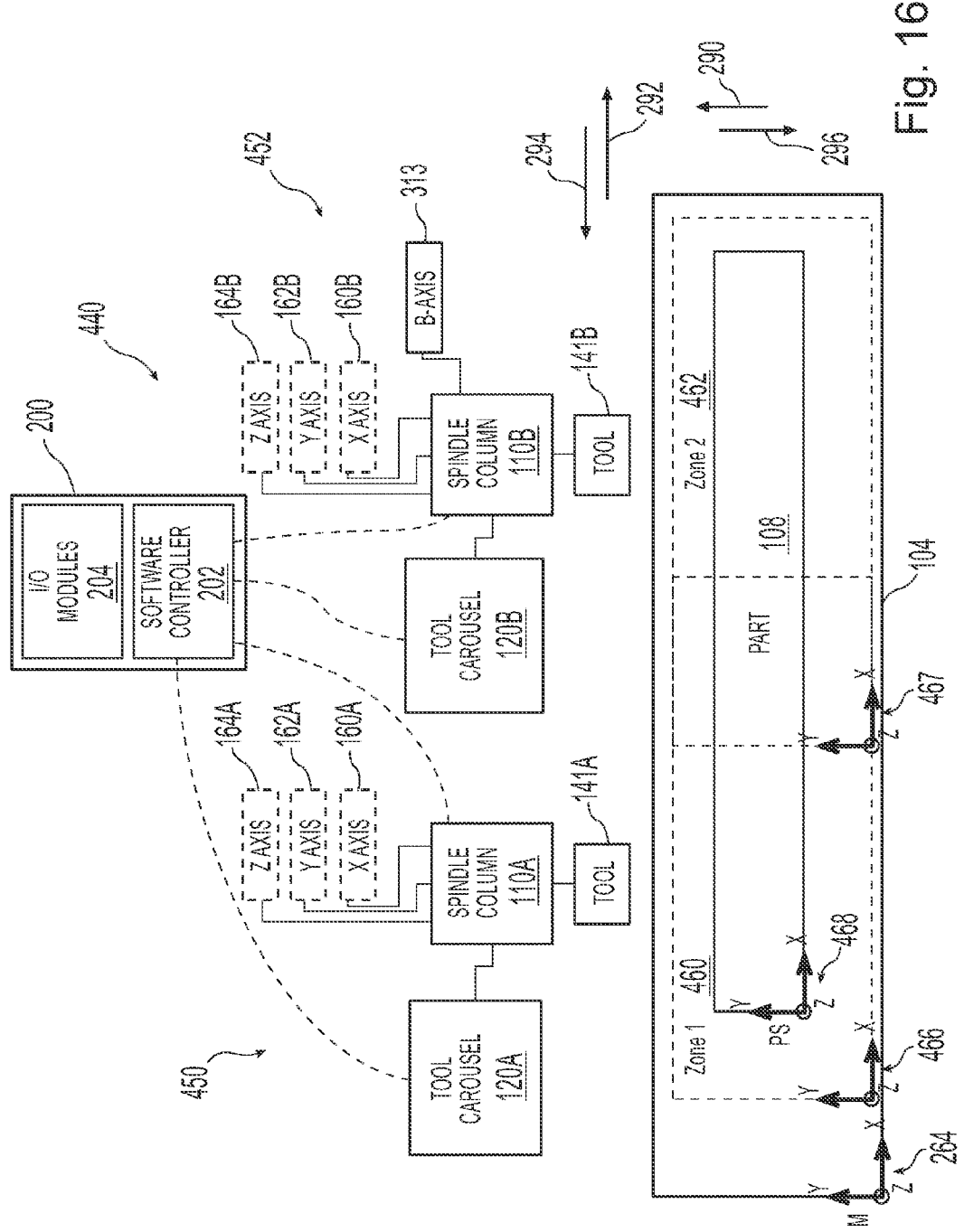
FIG. 16 illustrates an exemplary multi-interface machine tool system.

The concepts of zone programming also are applicable to multi-interface machine tool systems which have multiple interfaces with a part to remove material from the part during machining. At each interface a tool is supported that is used to engage the part to remove material from the part. In one embodiment, an exemplary machine tool system with multiple interfaces is a multi-turret lathe. An exemplary multi-turret lathe is represented in FIG. 15. In one embodiment, an exemplary machine tool system with multiple interfaces is a multi-spindle milling machine. An exemplary multi-spindle milling machine is represented in FIG. 16. Since these multi-interface machine tool systems have multiple interfaces with the part, they may be controlled so that during at least a portion of the machining of the part more than one tool is engaging to the part to remove material. Of course, at other instances in the machining of the part, less than all of the machining interfaces have a tool which is engaging the part.

Referring to FIG. 15, a multi-turret lathe machine tool system 400 is represented. Multi-turret lathe 400 is controlled by motion control system 200 to simultaneously cut the same part 108 with two or more cutting tools. As shown in FIG. 15, part 108 is supported by a chuck 402 which is rotated about an axis 404. A spindle 406 controlled by motion control system 200 rotates the chuck 402 in either direction about axis 404. Further, a first turret 410 (first interface 436) and a second turret 412 (second interface 438) are shown each having a respective tool 414 and 416. Turrets 410 and 412 are controlled by motion control system 200 to advance the respective tool towards part 108 in direction 418 for turret 410 and in direction 422 for turret 412 and to retract the respective tool away from part 108 in direction 420 for turret 410 and in direction 424 for turret 412. Directions 418 and 422 (and directions 420 and 424) are illustrated as being parallel. In one embodiment, direction 422 (and direction 424) is angled relative to direction 418 (and direction 420) at an angle greater than zero and less than ninety degrees. Of course, both the first turret 410 and the second turret 412 are controlled to move back-and-forth along the longitudinal direction of part 108 in directions 430 and 432 so that the respective tools may engage more portions of part 108.

It is possible to have both tool 414 and tool 416 engage the part 108 at the same time for at least a portion of or the complete machining cycle. There may be times wherein only one of the first tool 414 and the second tool 416 engages the part 108. In one embodiment, turret 410 is programmed in motion control system 200 as a first zone 430 and turret 412 is programmed in motion control system 200 as a second zone 432. As illustrated first zone 430 and second zone 432 each span the entire length of the part 108. The machining steps of the first zone 430 and the second zone 432 may be meshed together in a single part program as described herein and executed by the motion control system 200. Although two turrets are shown, any number of turrets may be included. In one embodiment, both tools 414 and 416 engage part 108 at the same time.

In one embodiment, the first turret 410 and the second turret 412 are positioned on the same sides of part 108. In the illustrated embodiment, the first turret 410 and the second turret 412 are positioned on opposite sides of part 108. In one embodiment, the first turret 410 is positioned on a first side of the part and the second turret 412 is positioned on a second side of the part.

Referring to FIG. 16, a multi-spindle milling machine tool system 440 is represented. Multi-spindle machine tool system 440 includes a plurality of interfaces, interfaces 450 and 452 shown, through which a tool engages the part 108 to remove material from the part 108. Multi-spindle machine tool system 440 includes a plurality of tool spindles that may simultaneously engage part 108. In the illustrated embodiment, a first tool spindle 110A (interface 450) and a second tool spindle 110B (interface 452) are represented. Each of tool spindles 110A and 110B have their own moveable axes. Spindle 110A includes three moveable axes. Spindle 110B includes four moveable axes including a rotary B-axis 313. In one embodiment, all of the axes of machine tool spindle 110A are independent of machine tool spindle 110B. In one embodiment, one or more of the moveable axes of machine tool spindle 110A and machine tool spindle 110B are shared, such as when one of the axes is a part of a moveable support 104.

The moveable axes of both interface 450 and interface 452 are controlled by motion control system 200 to simultaneously cut the same part 108 with two or more cutting tools at least during a portion of the machining of the part 108. Zone 1 460 in FIG. 16 corresponds to interface 450 and its spindle 110A. Zone 2 462 in FIG. 16 corresponds to interface 452 and its spindle 110B. In FIG. 16, zones 460 and 462 overlap. In one embodiment, zones 460 and 462 do not overlap.

Figure 17:
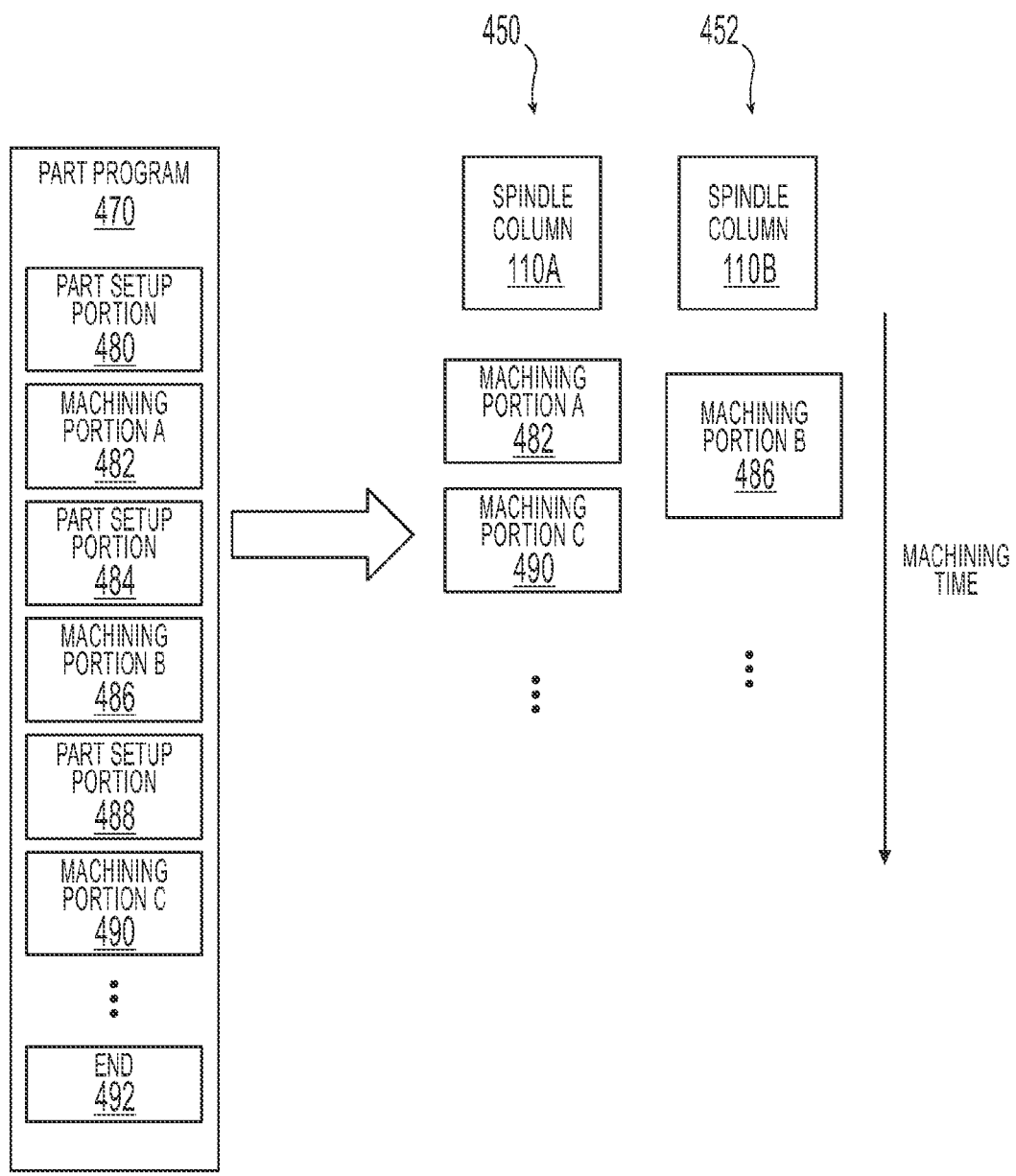
FIG. 17 illustrates a processing sequence of a multi-interface machine tool system wherein a part program being executed by the multi-interface machine tool system includes portions related to machining in a first zone of the multi-interface machine tool system and portions related to machining in a second zone of the multi-interface machine tool system.

Referring to FIG. 17, an exemplary operation of the multi-interface machine tool systems is represented. Since the multi-interface machine tool systems have multiple interfaces with the part, it is possible to execute machining instructions in parallel. Part program 470 will be discussed in relation to the multi-spindle machine tool system 440 of FIG. 16. In the illustrated example, part program 470 includes a first part setup portion, represented by block 480, which identifies zone 460 (which corresponds to interface 450) and provides the required offsets from zone 1 coordinate system 466 to part coordinate system 468. Part program 470 also includes a first machining portion, represented by block 482, which includes one or more machining steps for part 108 to be performed by machine tool system 440. Since these correspond to zone 460 (spindle 110A) motion control system 200 provides instructions to the appropriate control systems for spindle 110A. Part program 470 also includes a second part setup portion, represented by block 484, which identifies zone 2 (which corresponds to interface 452) and provides the required offsets from zone 2 coordinate system 467 to part coordinate system 468. Part program 470 also includes a second machining portion, represented by block 486, which includes one or more machining steps for part 108 to be performed by machine tool system 440. Since these correspond to zone 462 (spindle 110B) motion control system 200 provides instructions to the appropriate control systems for spindle 110B. As illustrated in FIG. 17, the execution of the machining instructions from block 482 with spindle 110A and the execution of the machining instructions from block 486 with spindle 110B may be performed in parallel. Part program 470 further includes a third part setup portion, represented by block 488, which identifies zone 460 (which corresponds to interface 450) and provides the required offsets from zone 1 coordinate system 466 to part coordinate system 468. Part program 470 also includes a third machining portion, represented by block 490, which includes one or more machining steps for part 108 to be performed by machine tool system 440. Since these correspond to zone 460 (spindle 110A) motion control system 200 provides instructions to the appropriate control systems for spindle 110A. Motion control system 200 continues to process the instruction in part program 470 until the end block 492 is reached.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An apparatus for machining a plurality of parts with at least one tool, the apparatus comprising:

a frame;

a support supported by the frame, the support supporting a first part in a first zone of a plurality of selectable zones associated with the support and a second part in a second zone of the plurality of selectable zones associated with the support, each of the plurality of selectable zones being located within a machining workspace of the apparatus;

a machine tool spindle supported by the frame and moveable relative to the first part and the second part, the machine tool spindle adapted to couple the at least one tool, at least one of the support and the machine tool spindle including a plurality of moveable axes which position the at least one tool relative to the first part and the second part; and a motion control system operably coupled to at least one of the machine tool spindle and the support, the motion control system executing the machining of the first part and the second part through a controlled movement of the plurality of moveable axes, wherein the first zone has a first kinematics arrangement controlled by the motion control system to machine the first part and the second zone has a second kinematics arrangement controlled by the motion control system to machine the second part, the first kinematics arrangement differing from the second kinematics arrangement.

2. The apparatus of claim 1, wherein the second zone has at least a first axis which is not shared with the first zone.

3. The apparatus of claim 1, wherein the first kinematics arrangement and the second kinematics arrangement have an equal number of moveable axes.

4. The apparatus of claim 1, wherein the first kinematics arrangement and the second kinematics arrangement have an unequal number of moveable axes.

5. The apparatus of claim 1, wherein the first kinematics arrangement and the second kinematics arrangement both include a shared rotary axis.

6. The apparatus of claim 1, wherein the controlled movement of the plurality moveable axes is based on a part program which includes instructions related to the machining of the first part and the second part.

7. The apparatus of claim 6, wherein the part program includes at least a first part setup portion, a first machining portion, a second part setup portion, a second machining portion, a third part setup portion, and a third machining portion, each of the part setup portions specifying which zone in which to position the tool spindle.

8. The apparatus of claim 7, wherein the first part setup portion specifies the first zone and the first machining portion includes machining instructions relative to the first part.

9. The apparatus of claim 8, wherein the second part setup portion specifies the second zone and the second machining portion includes machining instructions relative to the second part.

10. The apparatus of claim 9, wherein the third part setup portion specifies the first zone and the third machining portion includes machining instructions relative to the first part.

* * * * *